US012518274B2

(12) United States Patent
Anton et al.

(10) Patent No.: US 12,518,274 B2
(45) Date of Patent: Jan. 6, 2026

(54) EVOLVING ACTUAL POSSESSION TOKEN WITH VERIFIABLE EVOLUTION STATE

(71) Applicant: Onli, Inc., Phoenix, AZ (US)

(72) Inventors: Dhryl Anton, Scottdale, AZ (US); Michael McFall, Scottdale, AZ (US)

(73) Assignee: THE ONLI CORPORATION, Miami, FL (US)

( * ) Notice: Subject to any disclaimer, the term of this patent is extended or adjusted under 35 U.S.C. 154(b) by 1649 days.

(21) Appl. No.: 16/636,195

(22) PCT Filed: Aug. 3, 2018

(86) PCT No.: PCT/US2018/045284
§ 371 (c)(1),
(2) Date: Feb. 3, 2020

(87) PCT Pub. No.: WO2019/028442
PCT Pub. Date: Feb. 7, 2019

(65) Prior Publication Data
US 2025/0053972 A1   Feb. 13, 2025

Related U.S. Application Data

(60) Provisional application No. 62/541,056, filed on Aug. 3, 2017.

(51) Int. Cl.
*G06Q 20/38* (2012.01)
*G06Q 20/36* (2012.01)
*H04L 9/00* (2022.01)

(52) U.S. Cl.
CPC ......... *G06Q 20/389* (2013.01); *G06Q 20/367* (2013.01); *H04L 9/50* (2022.05)

(58) Field of Classification Search
CPC .............. G06Q 20/389; G06Q 20/367; G06Q 2220/00; G06Q 20/065; G06Q 20/40;
(Continued)

(56) References Cited

U.S. PATENT DOCUMENTS 10,949,856 B1 * 3/2021 Rangan .................... H04L 9/32
2015/0026072 A1 * 1/2015 Zhou ................... G06Q 20/401
705/41

(Continued)

FOREIGN PATENT DOCUMENTS

WO   WO-2012145530 A2 * 10/2012 ............. G06Q 20/00
WO   WO-2016202952 A1 * 12/2016 ............ G06Q 20/065

OTHER PUBLICATIONS

Andreas Antonopoulos, Mastering Bitcoin, Dec. 2014, O'Reilly Media, Inc. (Year: 2014).*

*Primary Examiner* — Chunling Ding
(74) *Attorney, Agent, or Firm* — Peter Jensen-Haxel

(57) ABSTRACT

Disclosed is a method, a device, a system and/or a manufacture of an evolving actual possession token with verifiable evolution state. In one embodiment, a method of ledgerless ownership through actual possession of an electronic token receives an electronic token that includes a set of data blocks each having a transaction data beginning with an issue transaction, with each data block having a block hash dependent on a previous block hash and on a secret value used to evolve the electronic token when adding a new block upon a transfer transaction. A new block and a new secret value is generated and input into a cryptographic hash function, resulting in an output that is a new block hash representing an evolved state of the token. The evolved state may be published to a state dataset that may establish an independent evidence of evolution of the electronic token.

18 Claims, 11 Drawing Sheets

ACTUAL POSSESSION TOKEN NETWORK 190

(58) Field of Classification Search
CPC .. G06Q 20/10; G06Q 20/223; G06Q 20/3823; H04L 9/50; H04L 2209/56; H04L 9/3239
See application file for complete search history.

(56) References Cited

U.S. PATENT DOCUMENTS

| | | | |
|---|---|---|---|
| 2016/0224977 A1* | 8/2016 | Sabba | G06Q 20/385 |
| 2016/0292680 A1* | 10/2016 | Wilson, Jr. | H04L 9/30 |
| 2017/0024818 A1* | 1/2017 | Wager | H04L 9/3234 |
| 2018/0113752 A1* | 4/2018 | Derbakova | H04L 9/3239 |
| 2018/0189312 A1* | 7/2018 | Alas | H04L 9/3239 |
| 2019/0028276 A1* | 1/2019 | Pierce | G06Q 20/367 |
| 2019/0130391 A1* | 5/2019 | Wright | H04L 9/50 |
| 2019/0334904 A1* | 10/2019 | Lelcuk | H04L 9/3213 |
| 2019/0347626 A1* | 11/2019 | Wullschleger | G06Q 20/3674 |
| 2020/0013027 A1* | 1/2020 | Zhu | H04L 9/50 |
| 2024/0144280 A1* | 5/2024 | Sierra | H04L 9/3247 |

\* cited by examiner

FIG. 1  ACTUAL POSSESSION TOKEN NETWORK 190

FIG. 2  ELECTRONIC TOKEN 200

HASH TREE
300

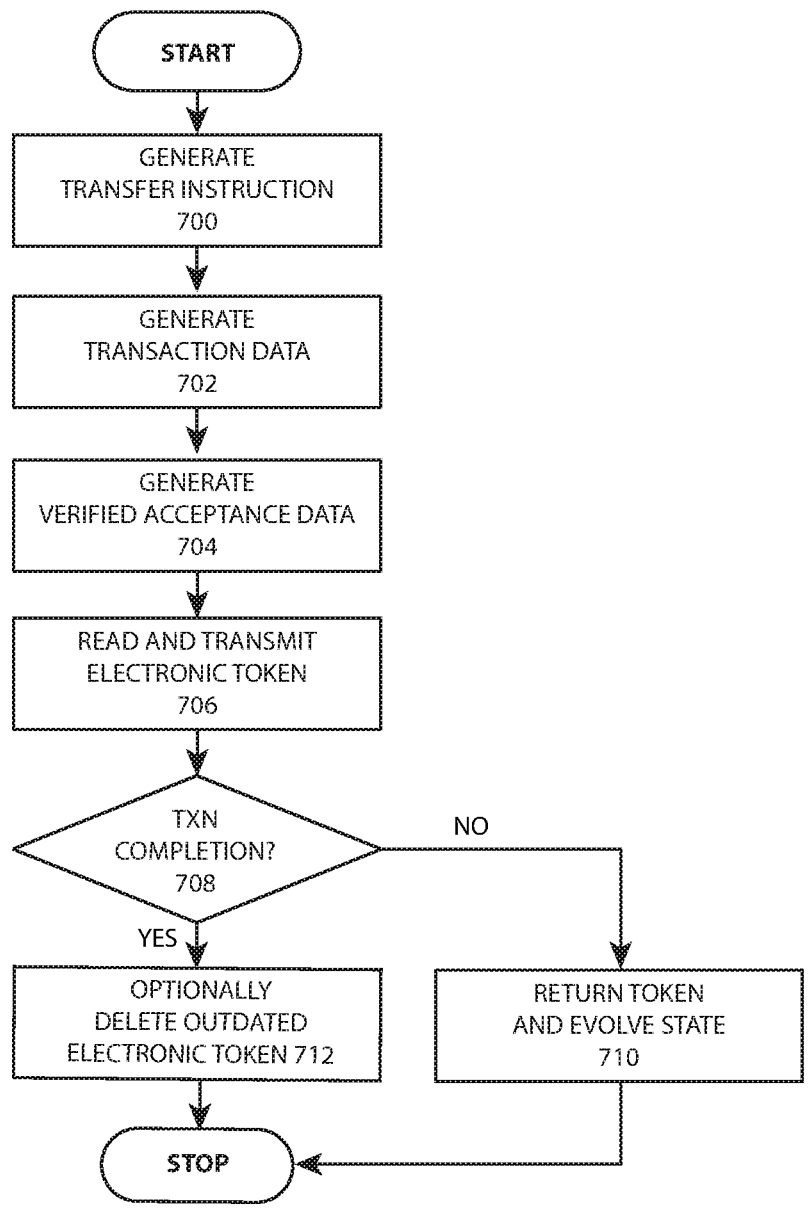
FIG. 7 TOKEN TRANSFER PROCESS FLOW

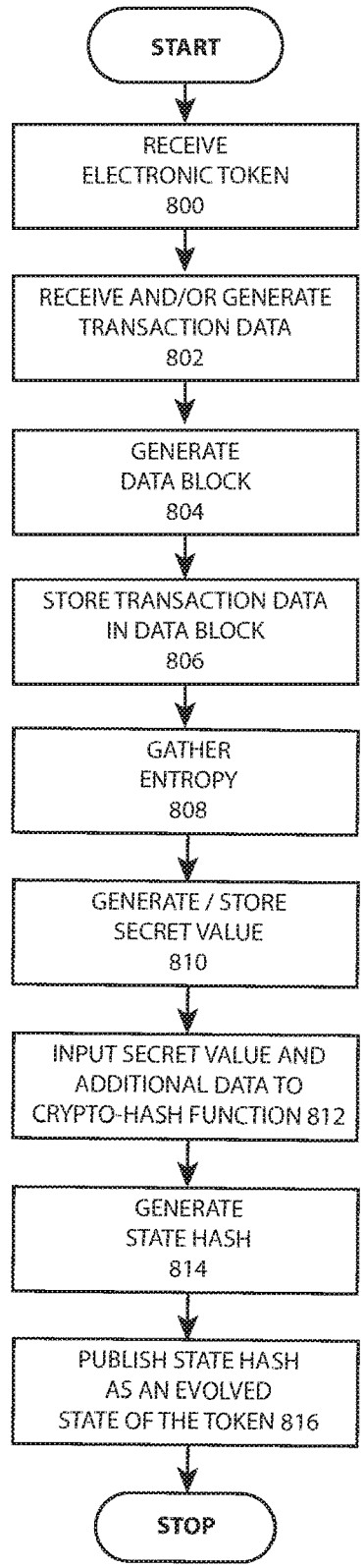
*FIG. 8*  TOKEN EVOLUTION PROCESS FLOW

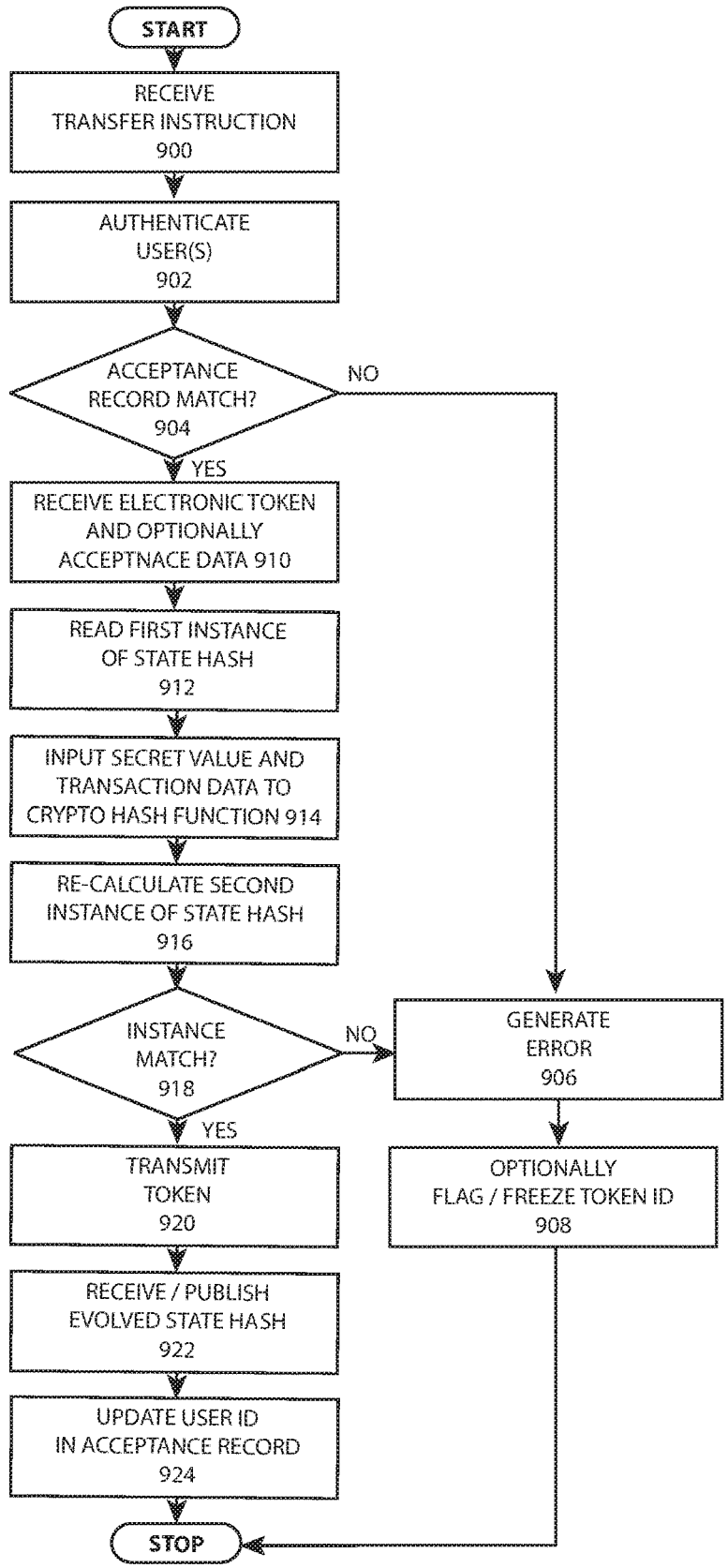
FIG. 9  FIRST TOKEN VALIDATION PROCESS FLOW

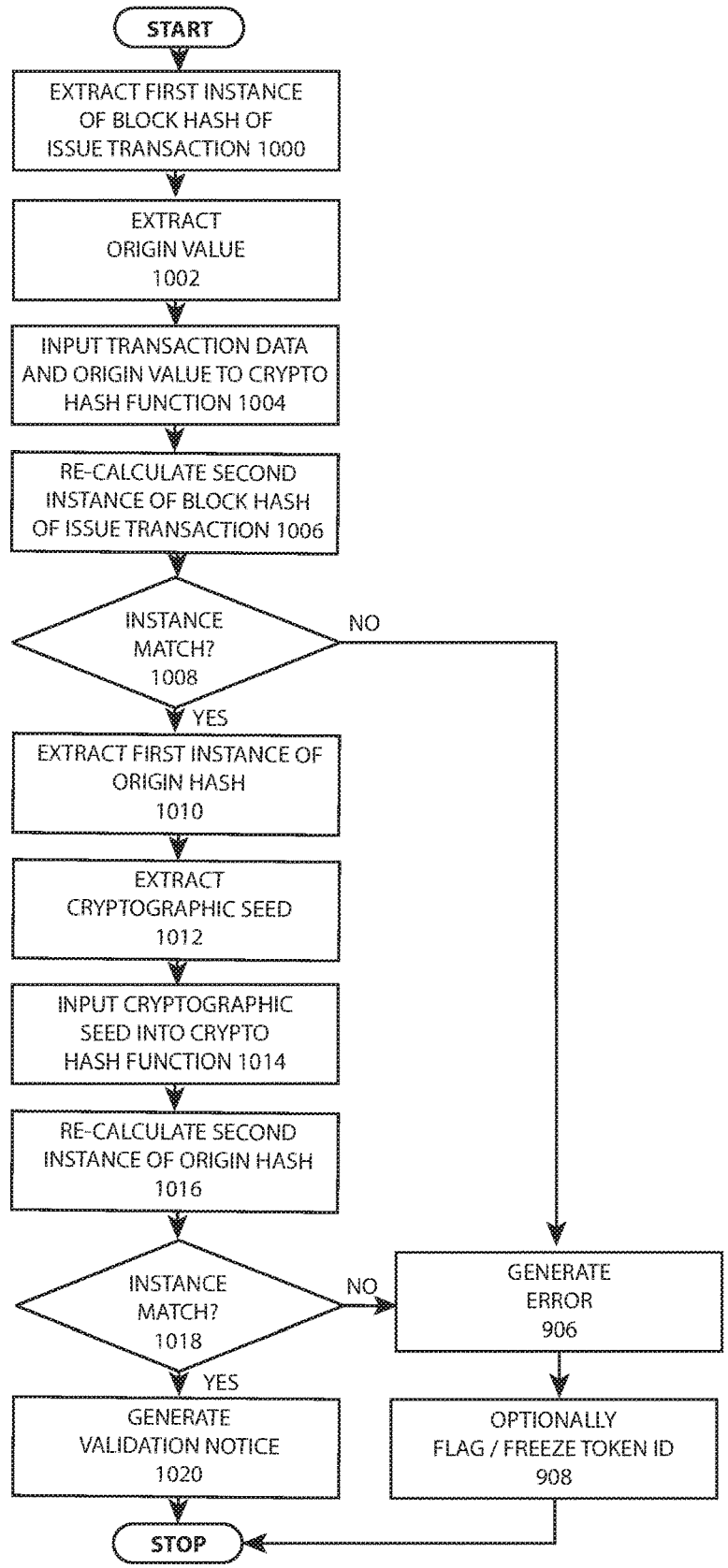
FIG. 10    SECOND TOKEN VALIDATION
PROCESS FLOW

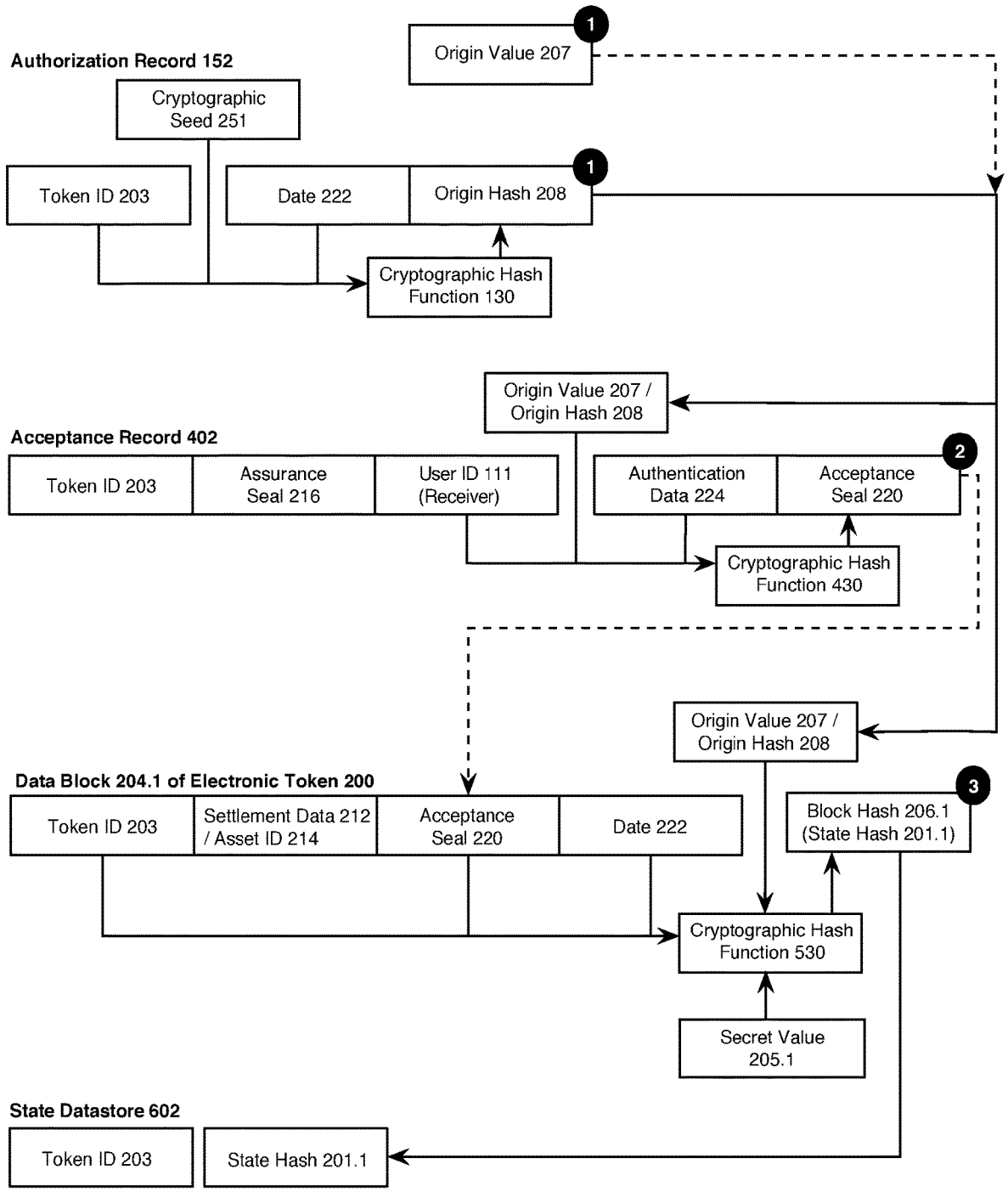
FIG. 11     ISSUE TRANSACTION

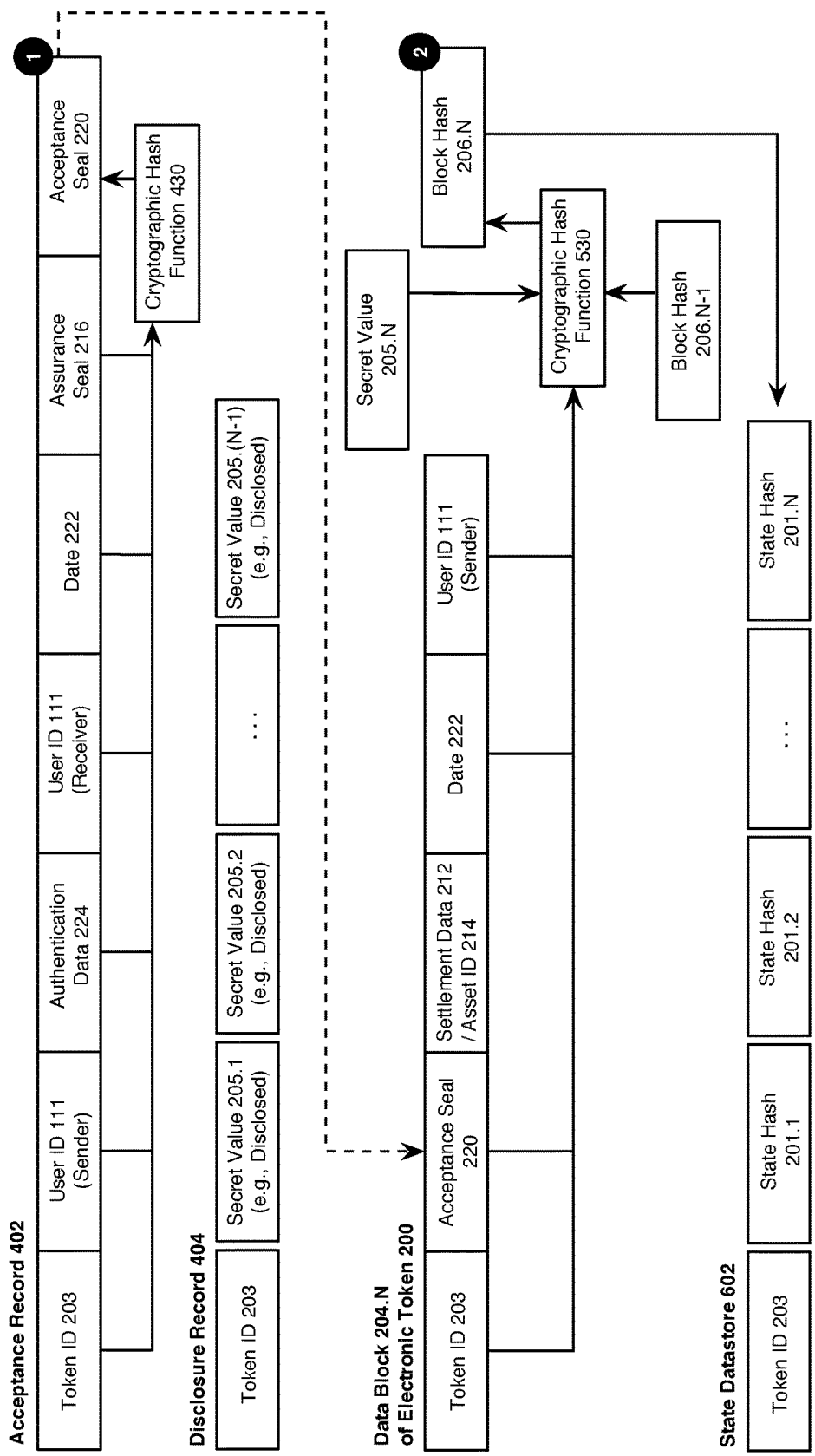
FIG. 12    TRANSFER TRANSACTION

EVOLVING ACTUAL POSSESSION TOKEN WITH VERIFIABLE EVOLUTION STATE

CROSS-REFERENCE TO RELATED APPLICATIONS

This application claims the benefit of International Patent Application No. PCT/US18/45284 under the patent cooperation treaty filed Aug. 3, 2018, entitled: EVOLVING ACTUAL POSSESSION TOKEN WITH VERIFIABLE EVOLUTION STATE, which claims the benefit of U.S. Provisional Application No. 62/541,056, filed Aug. 3, 2017, entitled: ELECTRONIC TOKEN. The patent applications identified above are incorporated here by reference in its entirety to provide continuity of disclosure.

FIELD OF TECHNOLOGY

This disclosure relates generally to data processing devices and, more particularly, to a method, a device, a system, and/or a manufacture of an evolving actual possession token with verifiable evolution state.

BACKGROUND

Digital technologies for representing and tracking ownership of assets are in general relatively fast and convenient compared to practices that predate data processing systems, for example paper ledgers or physically transferring possession of a large amount of a commodity. Sometimes digital technologies for representing and tracking ownership are also more accurate and secure. Asset "tokenization", including of an asset that is a real-world and/or physical asset, can imbue the token representing the asset with properties the asset does not have, for example almost instantaneous transfer or enforced trading rules.

A ledger has been used in many contexts to track ownership of the asset. However, copies of the ledger stored on separate computers may be difficult to coordinate, keep consistent, and keep safe. The ledger may also be subject to having entries changed when no transaction has taken place, for example from hacking or fraud. There may be little evidence of such manipulation of the ledger has occurred. In a distributed database, copies of the ledger may be stored on one or more computing devices and reconciled. If data is stored in a blockchain data structure, changes in entries can be detected and thus the data can made "immutable."

In a distributed ledger blockchain, a set of ledger copies stored in the blockchain data structure may be distributed over a set of computing nodes, where units of account or tokens in the ledger may represent the asset. A consensus mechanism may reconcile the ledger and prevent a value and/or token representing the asset from a "double spend." A capability to detect any attempted change in the data means that a tampered-with copy of the ledger can be disregarded in favor of a correct ledger copy determined through the consensus mechanism. Thus, the distributed ledger blockchain may make the ledger more consistent and more difficult to hack in some contexts.

However, there may be trade-offs. The consensus mechanism may be relatively slow compared to updates of previous systems and methods for storing the ledger. Value or token may be attached to a public key, where a private key unlocks the value or token, where the private key may be vulnerable to theft or hacking resulting in loss of the value or token. In addition, the set of computing nodes running a software application that runs the distributed ledger blockchain (e.g., including a consensus algorithm) may be able to "fork", creating diverging copies of the ledger. This may lead to confusion about which copy of the token represents the asset, especially if the asset is a physical asset in the real world.

Historically, one generally useful method for tracking ownership may be possession. Possession may work well for an asset in the physical world, but may be difficult to effect in the electronic world due to the relative ease of copying electronic bits of information. In general, the electronic bits as stored in a computer memory may easily be created, deleted, or copied. Systems, methods, and/or devices for electronic ownership tracking must be carefully designed to prevent copying, double-spending, and confusion over which token is tied to which asset.

SUMMARY

Disclosed are a method, a device, a system, and/or a manufacture of an evolving actual possession token with verifiable evolution state.

In one embodiment, a method of ledgerless ownership through actual possession of an electronic token includes receiving the electronic token in a current transfer transaction and storing the electronic token in a memory. The electronic token includes a data block of a previous transfer transaction and a block hash of the data block of the previous transfer transaction representing a state of the electronic token following the previous transfer transaction and generated as an output of a cryptographic hash function with inputs comprising the transaction data of the previous transfer transaction.

The method receives and/or generates a transaction data of the current transfer transaction, and stores the transaction data of the current transfer transaction in a data block of the current transfer transaction. An entropic input from an entropy source is gathered, and a secret value based on the entropic input is generated. The method inputs into a first cryptographic hash function inputs that include the transaction data of the current transfer transaction, the block hash of the data block of the previous transfer transaction, and the secret value. The method generates a block hash of the data block of the current transfer transaction as an output of the first cryptographic hash function, and stores the secret value in the computer memory.

A state hash representing an evolved state of the electronic token is published. The state hash is (i) the block hash of the data block of the current transfer transaction, (ii) an output of a cryptographic hash function with inputs that include the block hash of the data block of the current transfer transaction, and/or (iii) a value that is dependent on the block hash of the data block of the current transfer transaction. The publication establishes an independent evidence of evolution of the electronic token.

In another embodiment, an electronic token that can be actually possessed includes a data block of an issue transaction including a transaction data of the issue transaction and a block hash of the data block of the issue transaction representing a state of the electronic token following the issue transaction. The block hash of the data block of the issue transaction is generated as an output of a cryptographic hash function with inputs comprising the transaction data of the issue transaction.

The electronic token further includes a data block of a previous transfer transaction comprising a transaction data of the previous transfer transaction, and includes block hash of the data block of the previous transfer transaction representing a state of the electronic token following the previous transfer transaction and generated as an output of the cryptographic hash function with inputs comprising the transaction data of the previous transfer transaction and the block hash of the data block of the issue transaction. Through this hashing, a dependency of the block hash of the data block of the previous transfer transaction on the data block of the issue transaction is defined.

The electronic token further includes a data block of a current transfer transaction including a transaction data of the current transfer transaction, and a secret value usable to evolve the state of the electronic token. The electronic token also includes a block hash of the data block of the current transfer transaction representing an evolved state of the electronic token following the current transfer transaction, the block hash of the data block of the current transfer transaction and generated as an output of a cryptographic hash function with inputs that include the transaction data of the current transfer transaction, the block hash of the data block of the previous transfer transaction, and the secret value. Through this hashing, a dependency of the block hash of the data block of the current transfer transaction on both the data block of the previous transfer transaction and the data block of the issue transaction is defined.

The inputs of the cryptographic hash function outputting the block hash of the issue transaction may include an origin value that is withheld from the electronic token before the issue transaction. The transaction data of the issue transaction may include a settlement record, an asset ID of an asset to be cryptographically tied to the electronic token, and/or an assurance seal that is a hash of at least one of the settlement record and the asset ID.

In yet another embodiment, an electronic token that can be actually possessed includes a data block of an issue transaction comprising a transaction data of the issue transaction and a block hash of the data block of the issue transaction representing a state of the electronic token following the issue transactions and generated as an output of a cryptographic hash function with inputs including the transaction data of the issue transaction. The electronic token includes a data block of a current transfer transaction comprising a transaction data of the current transfer transaction, and a secret value used to evolve a current state of the electronic token following the current transfer transaction. A block hash of the data block of the current transfer transaction is also included, the block hash of the data block of the current transfer transaction and generated as an output of a cryptographic hash function with inputs comprising the transaction data of the current transfer transaction, a block hash of a data block of a previous transfer transaction, and the secret value. This hashing defines a dependency of the data block of the current transfer transaction on the data block of the previous transfer transaction and the data block of the issue transaction. The electronic token includes one or more leaf nodes of a hash tree terminating in a root node of the hash tree, the root node representing an evolved state of the electronic token following the current transfer transaction.

In still another embodiment, a method of validating an electronic token includes receiving a transfer instruction to initiate a current transfer transaction of an electronic token. The transfer instruction includes a token ID of the electronic token, a user ID of a user possessing the electronic token before the current transfer transaction, and a user ID of a user to receive possession the electronic token. The user possessing the electronic token before the current transfer transaction and a computing device of the user possessing the electronic token before the current transfer transaction is authenticated.

The method receives the electronic token and the secret value utilized in generating the block hash of the data block of the previous transfer transaction. An instance of the state hash of the electronic token is read and/or received from a state datastore, the state datastore independent of the user possessing the electronic token before the current transfer transaction. The data block of the previous transfer transaction and the secret value are input into one or more hash functions to output a recalculated instance of the state hash of the electronic token after the previous transfer transaction.

The recalculated instance of the state hash to the electronic token is compared to the instance of the state hash of the electronic token read from the state datastore. Finally, it is determined if a match occurs between the recalculated instance of the state hash and the instance of the state hash of the electronic token read from the state datastore to validate the previous transfer transaction of the electronic token.

In still yet another embodiment, a system for managing an electronic token that can be actually possessed includes an electronic vault that includes a token evolution engine and a treasury server that includes a transfer engine and a validation engine, with a network communicatively coupling the electronic vault and the treasury server. The system may include a validation system made up of two or more computing nodes, an origin server may include an extended validation engine, and an exchange server including an asset dataset.

BRIEF DESCRIPTION OF THE DRAWINGS

The embodiments of this detailed description are illustrated by way of example and not limitation in the figures of the accompanying drawings, in which like references indicate similar elements and in which:

FIG. 7 illustrates a possession transfer process flow in which possession of the electronic token is transferred, according to one or more embodiments.

FIG. 8 illustrates a token evolution process flow in which an evolved state of the electronic token of FIG. 2 is calculated and published, according to one or more embodiments.

FIG. 9 illustrates a first instance of a token validation process flow in which an ownership of the electronic token, the evolved state of the electronic token, and/or the transfer history of the electronic token is validated, according to one or more embodiments.

FIG. 10 illustrates a second instance of a token validation process flow in which an issuance and/or an authorization of the electronic token is validated, according to one or more embodiments.

FIG. 11 illustrates an issue transaction of the electronic token, including a cryptographic tie between the electronic token and an asset, according to one or more embodiments.

FIG. 12 illustrates a transfer transaction of the electronic token of FIG. 11, according to one or more embodiments.

Figure 1:
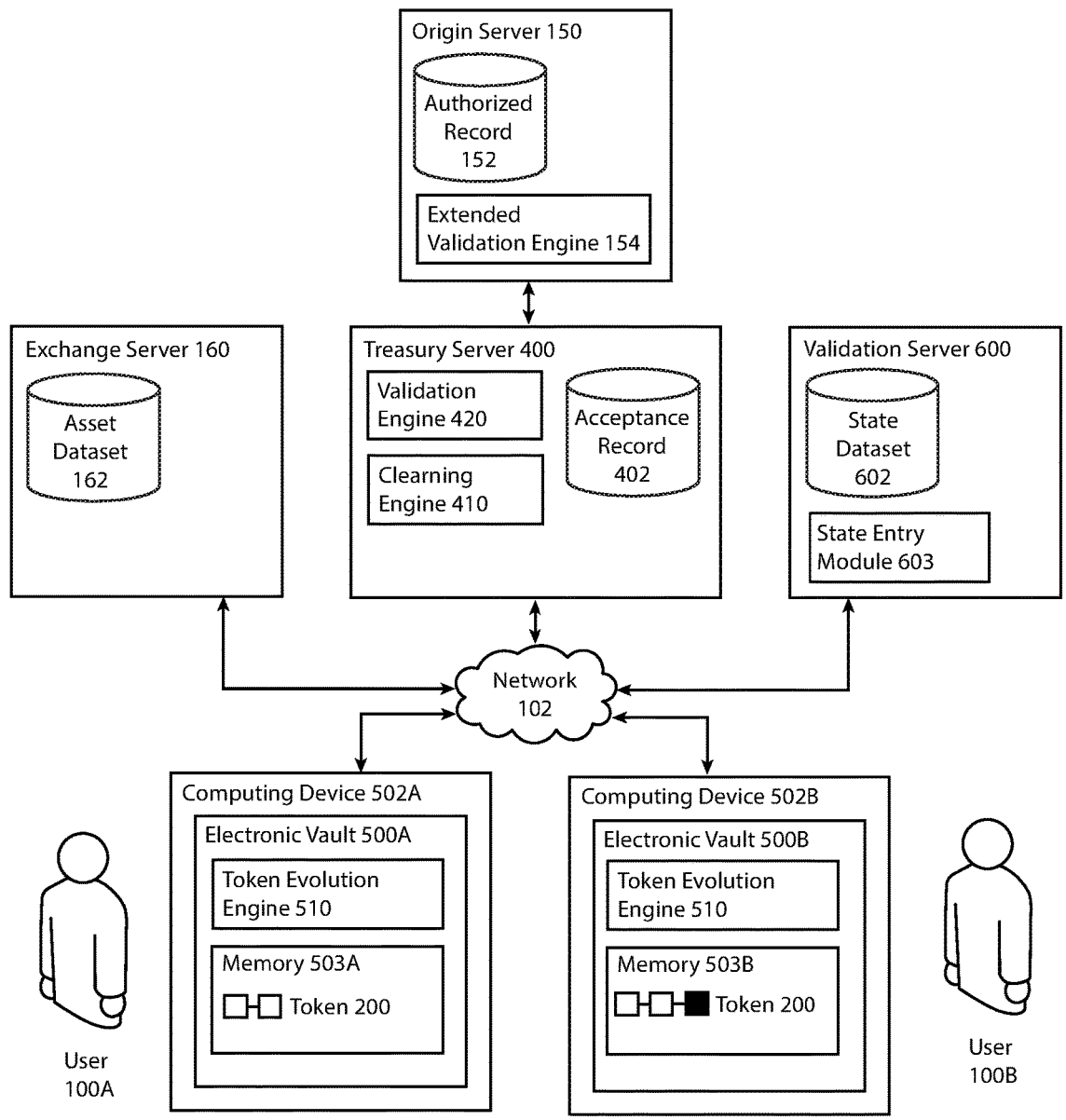
FIG. 1 illustrates an actual possession token network comprising an origin server originating an electronic token, a treasury server validating and clearing the electronic token, an exchange server cryptographically tying the electronic token to an asset, an electronic vault of a computing device of a user to store and evolve the electronic token, and a validation system to store evidence of an evolved state of the electronic token in a state datastore, according to one or more embodiments.

Other features of the present embodiments will be apparent from the accompanying drawings and from the detailed description that follows.

DETAILED DESCRIPTION

Disclosed are a method, a device and/or a system of secure initiation and transfer of a an evolving actual possession token with verifiable evolution state. Although the present embodiments have been described with reference to specific example embodiments, it will be evident that various modifications and changes may be made to these embodiments without departing from the broader spirit and scope of the various embodiments.

In one or more embodiments, a design goal is to create an electronic object that a user (e.g., the user 100) can possesses within a system the user controls (e.g., the computing device 502 such as a server computer or a smartphone) and that may remain unique. Accordingly, an electronic token 200 based on actual possession is shown and described in the present embodiments. A token based on actual possession, depending on implementation, may result in new properties such as: (i) there may be a clear transfer of ownership and settlement due to a change in possession, including to any asset cryptographically tied to the electronic token; (ii) a central authority (e.g., an operator of the treasury server 400) may not be able to confiscate the electronic token 200 stored in a user 100's electronic vault 500, (iii) the user 100 may be responsible for holding and keeping safe the electronic token 200 itself, rather than solely trust entries in a ledger held in custody by one or more parties or a distributed system; (iv) ownership may not primarily rely on public-private key encryption to store value in association with a public key, which may be susceptible to hacking and/or breaking of encryption through quantum computing; and (v) ownership may be verified through independent means (e.g., via the a validation system 600).

FIG. 1 illustrates an actual possession network 190 for creating, cryptographically tying to assets, physically delivering, and transferring possession of electronic tokens 200, according to one or more embodiments. Each of the elements, servers, and systems of FIG. 1 are connected through one or more communication networks (e.g., the network 102 which may be the internet, a LAN, a WAN). The actual possession network 190 may coordinate and store many instances of the electronic token 200 (e.g., 200A, 200B . . . 200N), for example one thousand or ten billion. Through the present embodiments, the electronic token 200 may also be shown and described as the "token 200."

An origin server 150 may initiate electronic tokens 200 which may be initially held in possession by a treasury server 400. The treasury server 400 may issue the electronic token 200. The issue transaction 110.1 may cryptographically tie the electronic token 200 with an asset (such as a stock, bond, fractional ownership interest, bar of gold, a commodity, and/or a piece of real estate), for example by including an asset ID 214 of the asset in a data block 204 of an issue transaction 110.1. The issue transaction 110.1 physically transfers the electronic token 200 (e.g., as opposed to changing an ownership entry in a ledger) to an electronic vault 500A of a user 100A. The electronic vault 500A evolves the electronic token 200 and returns evidence of a state evolution to the treasury server 400 and/or a validation system 600. The user 100A may subsequently transfer the electronic token 200 to the user 100B (e.g., the transfer transaction 110.2), where the electronic vault 500B evolves the electronic token 200 again and publishes evidence of a new state evolution.

The origin server 150 may (i) create origin values through one or more methods to initiate each electronic token 200, (ii) store a set of records of authorized electronic tokens 200, and (iii) conduct audits to verify authorization and/or authenticity of an electronic token 200. The origin server 150 is implemented on a computing device with a processor and a memory, and comprises an authorized record 152 and an extended validation engine 154, described below the description of FIG. 5.

The exchange server 160 may (i) coordinate the exchange of an asset or other value for an electronic token 200 tokenizing the asset, (ii) generate and store a set of records related to the asset, and (iii) provide data useful in tying the electronic token 200 to the asset.

The treasury server 400 may (i) manage issuance and redemption of electronic tokens 200; (ii) privately maintain current records of a user 100 possessing each electronic token 200 and other data relevant to transactions (e.g., via the acceptance record 402); (iii) clear and validate transactions, including in association with the validation system 600 and/or the origin server 150, and/or (v) publish a set of state hashes 201 to the validation system 600.

The electronic vault 500 may (i) receive and evolve one or more instances of the electronic token 200; (ii) provide authentication data associated with a user 100; (iii) provide acceptance information associated with the user 100 approving a transaction 110; and/or (iv) store the electronic tokens 200 securely. The electronic vault 500 may be a secure computing device 502 with client-side software that generates a secret value 205, and hashes the secret value 205 and the data block 204 of a current transfer transaction 110 to generate a new state hash 201, thus enforcing state evolution of the electronic token 200. The electronic vault 500 comprises a processor 501, a memory 503, an application program stored on the memory 503 and/or an application specific integrated circuit (ASIC) carrying out the function of the application program. The electronic vault 500 may also be implemented as a special hardware device. In contrast, the electronic vault 500 may be implemented on the computing device 502 such as a smartphone of the user 100. The electronic vault comprises a token evolution engine 510, as described in conjunction with FIG. 5.

The validation system 600 may (i) receive evidence of state evolutions of one or more of the electronic tokens 200; (ii) store the evidence of state evolutions in a state datastore 602; and (iii) respond to requests for the state evolutions (e.g., generated by the treasury 400 and/or the electronic vault 500). The validation system 600 may be implemented as a single server computer, a distributed database on one or more computing nodes (e.g., in a commercial database such as MongoDB®, Reddis®, Oracle®), or in a distributed ledger blockchain, whether private or public (e.g., Hyperledger®, Ethereum).

Figure 2:
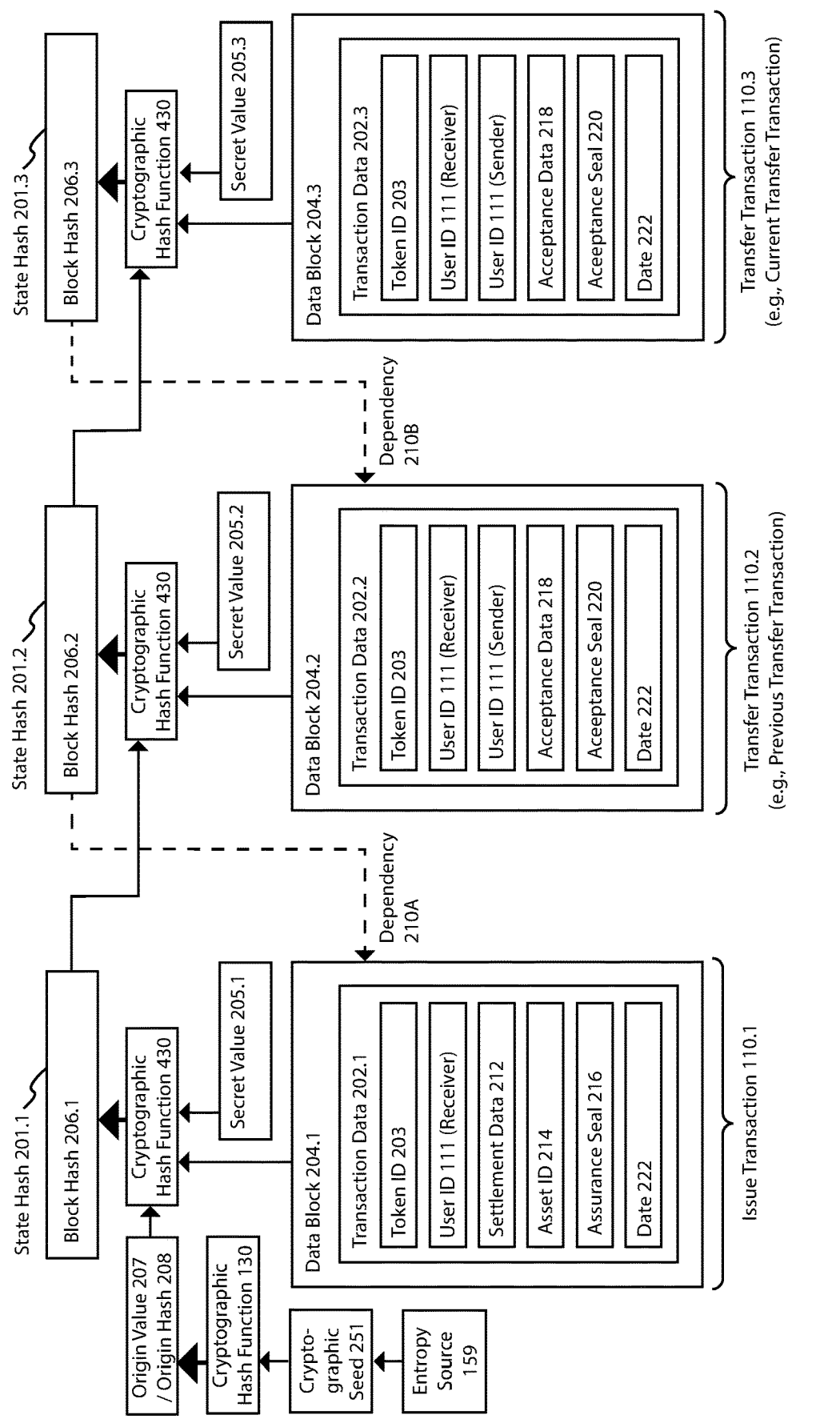
FIG. 2 illustrates the electronic token of FIG. 1, comprising a set of data blocks each having a transaction data and a block hash, each block hash generated as the output of a cryptographic hash function with inputs comprising the transaction data of the block hash, a block hash of a previous transfer transaction, and a secret value, with a block hash of a current transfer transaction representing an evolved state of the electronic token, according to one or more embodiments.

FIG. 2 illustrates the electronic token 200 of FIG. 1, according to one or more embodiments. The uniqueness of a collection of bits (e.g., the bits comprising the electronic token 200) is created through a forward moving state machine which may have a state evolution upon an event, for example enforced at an issue transaction 110.1 and each subsequent transfer transaction 110.2 to 110.N between instances of the electronic vault 500. Specifically, the electronic token 200 of FIG. 2 comprises one or more data blocks 204 in a sequence, each having a transaction data 202, and a block hash 206 that is the output of a cryptographic hash function (e.g., the cryptographic hash function 430, the cryptographic hash function 530) with inputs comprising a previous data block 204 in the sequence. Each data block 204, transaction data 202, block hash 206, may be described with a period followed by a number to indicate its position in the sequence (e.g., data block 204.1 of the issue transaction 110.1, transaction data 202.55 of a transfer transaction 110.55 that is the fifty-fifth transaction). In the present embodiments, a reference "N" may be associated with one or more transactions and/or evolution states of the electronic token 200. For example, the sequence of previous transfer transactions 110.2 through 110.N−2 leads to the previous transfer transaction 110.N−1, and to the current transfer transaction 110.N, and next to a new transfer transaction 110.N+1.

The block hash 206 of the issue transaction 110.1 may have no previous block hash 206, but instead optionally utilize an origin value 207. Each instance of the electronic token 200 may therefore be seeded, or originate, with the origin value 207. The origin value 207 for example can be a character string, a number, and/or a nonce. In one or more embodiments, the origin value 207 may be a hash value generated by a cryptographic hash function 130. In one or more other embodiments, the origin value 207 may have a unique physical origin recorded on a permanent media, referred to as a "proof". Each electronic token 200 may have a unique identifier (e.g., the token ID 203) which may allow for addressability of the electronic token 200 after any state evolution in the state history 303, for example a globally unique identifier (GUID).

In the embodiment of FIG. 2, the issue transaction 110.1 generates the transaction data 202.1 which is consolidated as the data block 204.1 when the block hash 206.1 is calculated as an initial state of the electronic token 200 (e.g., the state hash 201.1). The transaction data 202 may include, for example, the token ID 203, a user ID 111 associated with a user 100 and/or an electronic vault 500, a settlement data 212, and asset ID 214, an assurance seal 216, and a date 222. The settlement data 212 may be data describing a related transaction which resulted in issuance of the electronic token 200, for example payment through an asset exchange or a token exchange. The settlement data 212 for example may specify value traded for the electronic token 200 (e.g., USD, a unit of commodity, a cryptocurrency), a data of the settlement of the related transaction, and other data details. Similarly, the asset ID 214 may be an identifier of an asset, for example a GUID, a barcode, a tax lot number, and/or a legal description. The assurance seal 216 may be the output of a cryptographic hash function with inputs comprising the settlement data 212 and/or the asset ID 214. Alternatively, or in addition, the settlement data 212, the asset ID 214, and/or the assurance seal 216 may not be included in the data block 204.1, but may be input into the cryptographic hash function 130 such that the origin hash 208 is dependent and can later be traced solely by the treasury server 400 and/or the exchange server 160. The date 222 may be a time and/or a date of the transaction 110.N creating an instance of the data bock 204. The user ID 111 is unnecessary as possession of the electronic token 200 in its evolved state determines ownership, but the user ID 111 may be useful in providing additional data to the cryptographic hash function 430, the cryptographic hash function 530, and/or to track ownership at each state in the evolution of the electronic token 200.

The block hash 206 is the output of a cryptographic hash function with inputs comprising the transaction data 202, a secret value 205, and, in one or more embodiments, an origin value 207. In one or more preferred embodiments, the secret value 205 is generated and stored by the electronic vault 500 without any communication of the secret value 205 over the network 102 until such time as the user 100 issues an instruction to transfer the electronic token 200 (e.g., the transfer instruction). An instance of the secret value 205 may be encrypted and stored on the memory 503 for each instance of the electronic token 200 stored in the electronic vault 500. In one or more alternate embodiments, the secret value 205 can be generated and/or stored on a separate computing device. Upon transfer, the secret value 205 may be turned in (e.g., to the treasury server 400) to prove that the most evolved state of the electronic token 200 was generated by the user 100 and/or the electronic vault 500 of the user 100, as described throughout the present embodiments.

The data block 204 comprises a transaction data 202.2 that may include similar elements to the transaction data 202.1, and in addition may include a user ID 111 of a receiver of possession of the token 200 following the transfer transaction 110.2, a user ID 111 of a sender who transferred possession of the electronic token 200 after initiating the transfer transaction 110.2, an acceptance data 218, and an acceptance seal 220. The acceptance data 218 may include additional data relating to a time, a method, a geospatial coordinate, an IP address, a device MAC address, or other data describing or relevant to the transaction 110. Alternatively, or in addition, the acceptance data 218 can be hashed into an acceptance seal 220. In such case, the acceptance seal 220 can be included in the transaction data 202 whereas the acceptance data 218 can be stored elseware (e.g., the acceptance record 402).

FIG. 2, for clarity, illustrates the electronic token 200 after undergoing only three instances of the transactions 110: an issue transaction 110.1, a transfer transaction 110.2, and a transfer transaction 110.3. However, the electronic token may undergo hundreds, thousands, or many more instances of the transaction 110. A most recent transaction 110 is referred to as a current transfer transaction, and a transaction 110 immediately preceding the current transfer transaction is a previous transfer transaction. In reference to the current transfer transaction, the following transaction to be initiated as referred to as a next transfer transaction. Any of the foregoing transactions may be designated as the reference 'N' for explanatory purposes with a transaction before 'N' as 'N−1' and a transaction after 'N' as 'N+1'.

Each block hash 206 is the output of a cryptographic hash function with inputs comprising a previous block hash 206 (except in the case of the block hash 206.1 of the issue transaction 110.1). In FIG. 2, the block hash of 206.2 is dependent on and draws a dependency 210 to the transaction data 202.1. The block hash 206.3 is dependent on and draws a dependency 210 to the transaction data 202.2 (and by extension to the transaction data 201.1). More generally, a block hash 206.N is dependent (e.g., draws a dependency 210) on a transaction data 202.(N−1). The set of dependencies 210A through 210N based on hash functions may be referred to as forming a hash chain.

Although not shown, in one or more embodiments the secret value 205.N if disclosed to the treasury server 400 during a transfer transaction 110.N+1 and included in the transaction data 202.N+1 of the next transfer transaction 110.N+1, such that the user 100 who is the possessor of the electronic token 200 can re-calculate the block hash 206.N of the electronic token 200. Where the secret value 205 that is disclosed thereafter is included with the electronic token 200 (except the secret value 205 utilized in the most recent token evolution), the user 100 may be able to calculate and verify each block hash 206 of the electronic token 200.

Figure 3:
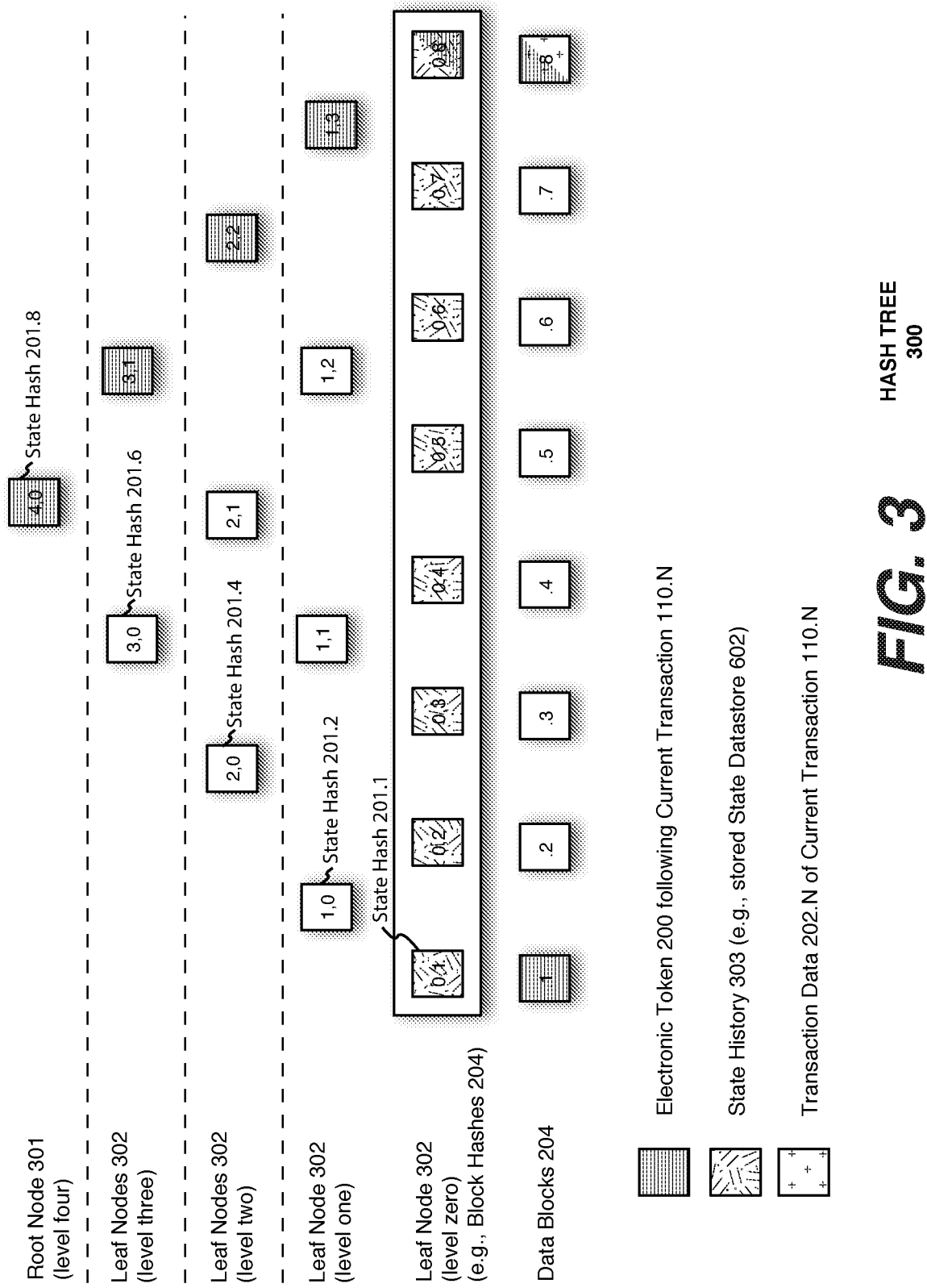
FIG. 3 illustrates a hash tree implementation of the electronic token of FIG. 2, according to one or more embodiments.

The state hash 201 represents an evolved state of the electronic token 200 following completion of a transaction 110. In the embodiment of FIG. 2, a most recent state of the electronic token 200 is the state hash 201.3. As shown and described in FIG. 3, the state hash 201 may be implemented as a value other than a block hash 206 but that necessarily depends on the block hash 206. FIG. 2 illustrates an instance of the electronic token 200 retaining each set of data blocks 204 for each transaction 110. However, in one or more embodiments, the electronic token 200 is only a subset of the data blocks 204 in the electronic token 200's transaction history. FIG. 3, accordingly, illustrates a hash tree implementation (and more specifically a Merkle tree) of the electronic token of FIG. 2, according to one or more embodiments.

In the embodiment of FIG. 3, a subset of the hash tree 300 implements the electronic token 200. FIG. 3 illustrates a single instance of the electronic token 200, following an issue transaction (e.g., the data block 204 denoted ".1"), and seven subsequent transfer transactions 110 between instances of the electronic vault 500 (e.g., transactions 110 ".2" through ".8"). Along with the secret value 205, each data block 204 is hashed to output a level zero leaf node 302. For example, the data block 204.1 is hashed to result in the block hash 206.1, which in turn is a level zero leaf node 302 of the hash tree 300 (and specifically, the leaf node denoted "0,1", also referenced as leaf node "302(0,1)"). One skilled in the art of computing will recognize that leaf node 302(0,1) and leaf node 302(0,2) are hashed to result in leaf node 302(1,0); leaf node 302(1,0) and leaf node 302(1,1) are hashed to result in leaf node 302(2,0), etc., and that during an odd number of data blocks 204 the leaf node 302 is copied to result in an even number of level-zero leaf nodes, then later replaced upon resumption of an even number of data blocks 204 (e.g., therefore, except for the state hash 201.1, no odd-numbered state hashes 201 are illustrated in FIG. 3, but can be calculated if needed from the level zero leaf nodes 302).

The data block 110.1 may include all data required to compute leaf node 302(0,1) except the origin value 207, which may be held by a different entity for security purposes (e.g., the origin server 150). The origin server 150 may be able to prove a specific origin value 207 was used to generate leaf node 302(0,1) by plugging the origin value 207 associated with the electronic token 200's token ID 203 into the data block 204.1 stored in the hash tree 300 to recalculate leaf node 302(0,1). This may allow the origin server 150 to certify that the electronic token 200 originates from the origin value 207, an origin hash 208, and/or a proof as a unique physical origin. With each transaction 110 the hash tree 300 evolves replacing and/or adding a new right-hand edge of the hash tree 300. Existing instances of the leaf node 302 are used to generate a new root node 301. In one or more embodiments, the root node 301 represents the evolved state of the electronic token 200.

In one or more embodiments, a set of instances of the root node 301 may be added to and/or published to the state datastore 602, for example one instance after each transaction 110 of the electronic token 200. Alternatively, or in addition, a set of zero-level leaf nodes 302 may be added to and/or published to the state datastore 602 such that any of the root node 301 of the hash tree 300 (and thus the state hash 201) can be calculated at any point in a transaction history of the electronic token 200. The set state hashes 201 and/or the level zero leaf nodes 302 of all transactions 110 of the electronic token 200 is referred to as the state history 303 of the electronic token 200.

In the embodiment of FIG. 3, a portion of the hash tree 300 becomes the evolved electronic token 200, a portion of the hash tree 300 may be stored and/or published to the state datastore 602, and a portion may be optionally and automatically discarded (e.g., "trimmed."). Elements of the electronic token 200 in FIG. 3 are shown shaded in horizontal lines, includes the first data block 204.1, the last data block 204.8, and each node of the youngest edge of the hash tree 300: leaf nodes 302(0,8), 302(1,3), 302(2,2), 302(3,1) and 302(4,0). Level zero leaf nodes 302 shown shaded in mixed angle broken lines may be published to the data dataset 602 and, upon query, may be used to calculate any of the electronic token 200's previous state hashes 201 (e.g., the previous state hash 201.7, the state hash 201.6, etc.). The most recent transaction 110 (e.g., generating the data block 204.8 and shaded with 'plus' crosshatching) may result in storage and/or publication of the latest root node 301 to the state datastore 602 (e.g., in the embodiment of FIG. 3, leaf node 302(0,8)). As the electronic token 200 evolves, all leaf nodes 302 may be trimmed except the first data block 204.1, last data block 204.N, last level zero leaf node 302(0,N), and leaf nodes 302 of the youngest edge of the hash tree 300 leading to the root node 301, according to one or more embodiments.

Figure 4:
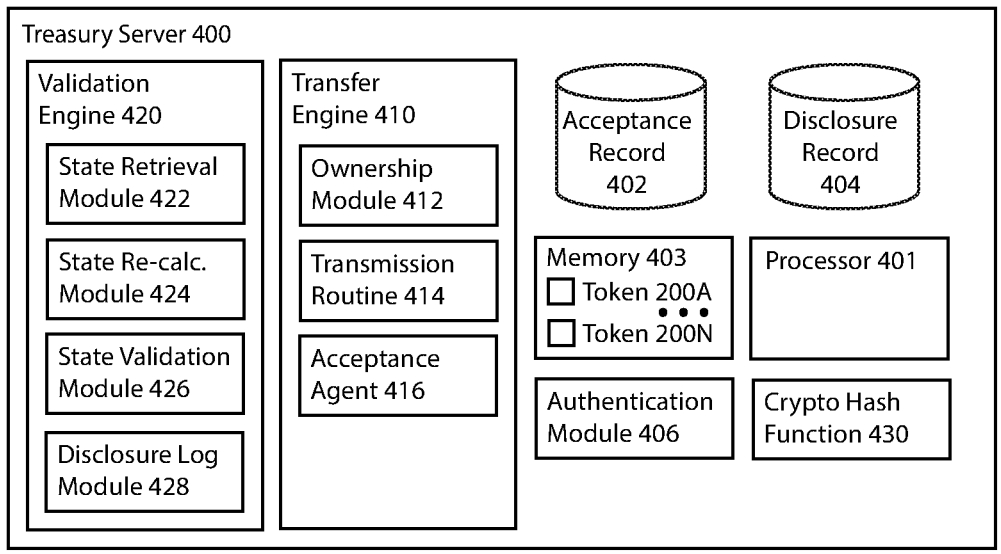
FIG. 4 illustrates the treasury server of FIG. 1, including a validation engine, a transfer engine, an acceptance record, and a disclosure record, according to one or more embodiments.

FIG. 4 illustrates the treasury server 400 of FIG. 1, including an acceptance record 402, a disclosure record 404, a transfer engine 410, and a validation engine 420, according to one or more embodiments. The treasury server 400 is a computing device (e.g., a server computer in a data center) having a computer processor 401 and a memory 403. The memory 403 (and each of instance of the memory in the present embodiments such as the memory 503) may be, for example, RAM, a memrister, an optical storage drive, a solid state memory, etc. An authentication module 406 comprises computer readable instructions that when executed on the processor authenticates an instance of the user 100, the electronic vault 500, and/or the computing device 502 implementing the electronic vault 500. The acceptance record 402 may store data for each instance of the electronic token 200 related to transactions 110, acceptance data 218 related to acceptance by one or more users 100, the acceptance seal 220, settlement data 212, the asset ID 214, the assurance seal 216, and other data. The treasury server 400 includes a cryptographic hash function 430 (e.g., SHA1, SHA256, SHA512-256).

The transfer engine 410 comprises computer readable instructions that when executed on the processor 401 of the treasury server 400 carry out a number of functions related to transfer and clearing the electronic token 200. For example, an ownership module 412 may determine if an instance of the user 100 listed as a last possessor of the token 200 in the acceptance record 402 matches an instance of the user 100 initiating a transfer transaction 110. The transmission routine 144 coordinates what is known in the art as a database transaction (also referred to as ACID compliance, or an ACID transaction), in which the transaction 110 must complete or fail, and if failed "roll-back" to a previous state in time. The acceptance agent 416 may request, receive, and/or process additional acceptance for completion of the transaction 110. For example, a biometric authentication may be required where a transaction 110 would transfer more than one thousand instances of the electronic token 200. Additional functions of the transfer engine 410 are shown and described in conjunction with the process flow of FIG. 7, and examples of the acceptance record 402 are shown and described in FIG. 11 and FIG. 12. Upon any roll-back, however, the state of the electronic token 200 may be evolved again to ensure the disclosed instance of the secret value 205 is not misused, in which case a transaction 110 may be defined in which the sender and receiver may have the same user ID 111.

The validation engine 420 comprises computer readable instructions that when executed on the processor 401 of the treasury server 400 carry out a number of functions related to validating an instance of the electronic token 200 after a transaction 110 is initiated. A state retrieval module 422 may query the state datastore 602 to retrieve state hashes 201, block hashes 206, or nodes of the hash tree 300 that are stored in the state datastore 602, for example by sending a request to the validation system 600 over the network 102. In one or more embodiments, the state retrieval module 422 may retrieve the entire state history 303. The state re-calculation routine 424 may re-calculate one or more instances of the state hash 201 of the electronic token 200, which may pass the result to a state validation module 426 that may compare the retrieved state and the re-calculated state to determine a match to validate one or more state evolutions of the electronic token 200. A disclosure log module 428 may retrieve and store the secret value 205 (e.g., the secret value 205.N used to evolve the data block 204.N that formed before the current transfer transaction 110.N+1 was initiated) in the disclosure record 404, for example in association with the token ID 203 as shown in FIG. 12. Some of the processes that may be effected by the validation engine 420 are shown and described in conjunction with the process flow of FIG. 7.

Figure 5:
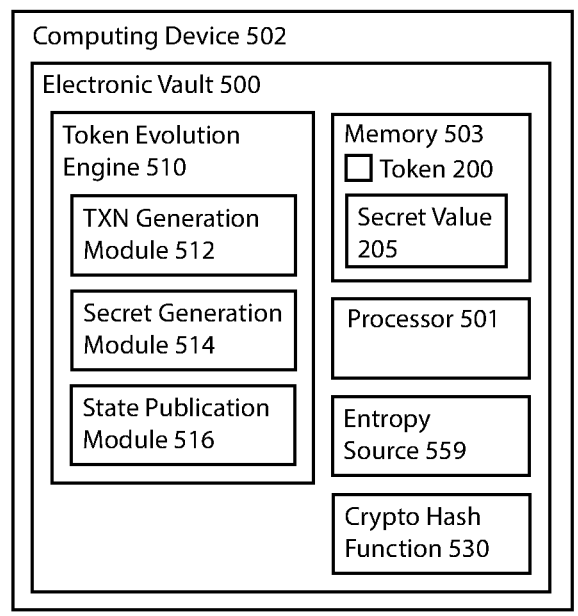
FIG. 5 illustrates the computing device and the electronic vault of FIG. 1, including an entropy source and a token evolution engine, according to one or more embodiments.

FIG. 5 illustrates the computing device 502 and the electronic vault 500 of FIG. 1, including an entropy source 559 and a token evolution engine 510, according to one or more embodiments. The electronic vault 500 includes a memory 503 and a processor 501. The memory 503 may store one or more instances of the electronic token 200, one or more instances of the secret value 205 used to evolve the instances of the stored electronic token 200, and computer readable instructions implementing the token evolution engine 510. The transaction generation module 512 (denoted "TXN generation module 512") assembles the transaction data 202 of a newly forming data block 204. The secret generation routine 514 gathers an entropic input from the entropy source 559 and passes the entropic input into the cryptographic hash function 530 (e.g., SHA1, SHA256, SHA512-256) to output a block hash 206 and/or an evolved instance of the state hash 201. A state publication module 516 publishes the state hash 201 of the evolved instance of the electronic token 200, for example to the validation system 600.

In one or more embodiments, the electronic vault 500 may be implemented on a computing device 502, and may share or utilize a memory 503 of the computing device 502 and/or a processor 501 of the computing device 502. In one or more embodiments, the electronic vault 500 may be implemented as an application program on a tablet computer, a laptop computer, a desktop computer, a server computer, a smartphone, and/or a special purpose hardware device wherein the processes of the token evolution engine are effected by an application specific integrated circuit (ASIC). Some of the processes of the token evolution engine 510 are shown and described in conjunction with FIG. 8.

The origin server 150 of FIG. 1 is a computing device that includes a processor, a memory, an authorized record 152 and an extended validation engine 154. The authorized record 152 stores data related to instances of the electronic token 200 that have been authorized to circulate in the actual possession token network 190. The authorized record 152 may include a set token ID 203's authorized to circulate, and may store in association with each instance of the token ID 203 the origin value 207, origin hash 208, and/or a physical proof as a cryptographic seed 251 from which the origin hash 208 derives. The extended validation engine 154 comprises computer readable instructions that when executed on the processor of the origin server 150 validate that an electronic token 200 derives from the origin value 207 and/or that the origin hash 208 derives from the cryptographic seed 251. One or more processes that can be effected by the extended validation engine 154 are shown and described in conjunction with FIG. 10.

The exchange server 160 is a computing device that includes a processor, a memory, and an asset dataset 162. The exchange server 160 may execute additional functions and application programs not shown or described in the present embodiments, for example coordinating an "on-ramp" or "off-ramp" for assets, commodities, and/or other value for which a user 100 may buy or sell instances of the electronic token 200. The asset dataset 162 includes data on settlement or assets which may be cryptographically tied to one or more of the electronic tokens 200. The asset dataset 162 may store an asset ID 214 corresponding to an asset, the settlement data 212 for one or more instances of the token 200, and/or an assurance seal 216 that is the output of a cryptographic hash function with inputs comprising the asset ID 214, the settlement data 212, and/or other data related to the asset. Data entries in the asset dataset 162 may include the token ID 203. Although not shown in the present embodiments, the exchange server 160 may include a validation engine 420 which may be used to redeem instances of the electronic token 200 for the asset cryptographically tied to it by combining the published state hashes 201 of the state datastore 602 with the electronic token 200 stored on an electronic vault 500 to prove current possession of a most recently updated state, e.g., without involvement of the treasury server 400. This may be advantageous where the treasury server 400 runs into operational difficulties or other challenges, therefore permitting independent recognition of the electronic token 200 and/or independent redemption.

Figure 6:
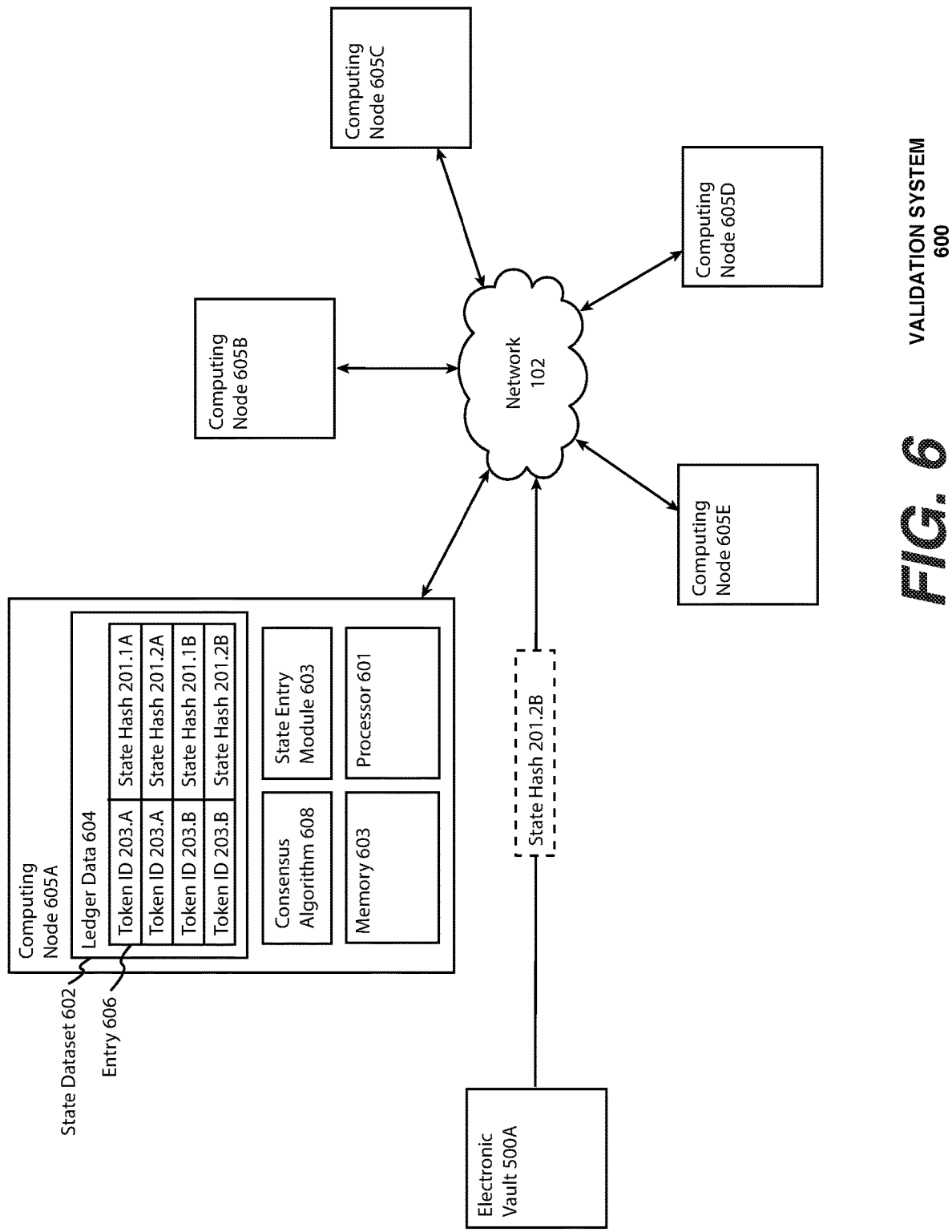
FIG. 6 illustrates the validation system of FIG. 1 storing a state datastore, and specifically an implementation wherein a ledger data stores a state of the electronic token as an entry in the ledger data, with the ledger data distributed among a set of computing nodes each having a consensus algorithm resulting in operation of a consensus mechanism, according to one or more embodiments.

FIG. 6 illustrates the validation system 600 of FIG. 1 storing a state datastore 602 and a state entry module 603. The state entry module 603 comprises computer readable instructions that when executed on the processor 601 receives a state hashes 201 and create an entry 606 of the state hash 201 in association with the token ID 203. In one or more embodiments, the validation system 600 may be a server computer with a processor and a memory. The validation system 600 may also be two or more server computers (e.g., computing nodes) storing the state datastore 602 as a distributed database. The distributed database may be rendered eventually consistent through a raft algorithm.

However, the embodiment of FIG. 6, illustrates an implementation of the validation system 600 wherein a ledger data 604 stores a set of states of the electronic token 200 as a set of entries 606 in the ledger data 604, with the ledger data 604 distributed among a set of computing nodes 601. The ledger data 604 may be stored in a blockchain data structure. Each computing node 605 may have a consensus algorithm 608 resulting in operation of a consensus mechanism across all instances of the computing nodes 601. The copy of the ledger data 604 may be reconciled through the consensus mechanism validating each instance of the entry 606 in the ledger data 604.

Each computing node 605 may be authenticated as a "permissioned" distributed network. Similarly, each publisher (e.g., the electronic vault 500A) may be authenticated and permissioned. Each user 100, including but not limited to using the electronic vault 500, may run an instance of the computing node 605. In one or more embodiments, the consensus algorithm 608 may implement the consensus mechanism that is a byzantine fault tolerance. However, in one or more embodiments the ledger data 604 may stored as part of a public and/or "permissionless" blockchain (e.g., Ethereum, EOS).

In the embodiment of FIG. 6, the validation system 600 may receive a state hash 201.2B (e.g., a block hash 206.2 of an electronic token 200B) from an electronic vault 500A and/or the treasury server 400. One instance of the computing node 605 (e.g., the computing node 605A) may receive the state hash 201.2B and store the state has 201.1B in association with the token ID 203.B. The computing node 605A receiving the state hash 201.2B may then propagate the entry 606 to additional instances of the computing node 605. The consensus algorithm 608 may periodically and/or randomly select an instance of the computing node 605 to include the "correct" set of entries 606 and solidify the ledger data 604 in a data block of the ledger data 604 (distinct from the data block 204 of the electronic token 200). Depending on properties of the consensus algorithm 608, the reconciliation may occur according to a "block time," for example ten minutes, two minutes, ten seconds, or another timeframe. The validation system 600 may therefore provide an independent evidence of current possession, but with ownership still determined by possession of the electronic token 200 itself. In one or more embodiments the ledger data 604 includes no reference to the user ID 111 of a current possessor of the electronic token 200, and therefore therefore only stores evidence of state evolution usable to verify ownership and/or the state history 303.

FIG. 7 illustrates a possession transfer process flow in which possession of the electronic token 200 is transferred, according to one or more embodiments. Operation 700 generates a transfer instruction initiating a new transfer transaction 110.N+1 in which possession of the electronic token 200 to transfer to a user 100B to receive possession of the electronic token 200 following the new transfer transaction 110.N+1 (e.g., transfer to the electronic vault 500B of the user 100B). For example, referring to FIG. 1, operation 700 may receive a user ID 111B of the user 100B and a number of tokens (e.g., 100, 333, 1 million) to be transferred from an input of a user interface on the computing device 502A. Operation 702 generates a transaction data 202 of the new transfer transaction 110.N+1. For example, operation 702 may gather a token ID 203, a user ID 111B of the user 100B who is the receiver, the user ID 111A of the sender, an acceptance data 218, an acceptance seal 220, and/or a date 222. Operation 702 may also gather partial transaction data 202 for the data block 204.N+1, in which case the receiving electronic vault 500B and/or the treasury server 400 may add or complete additional aspects of the transaction data 202, including but not limited to where the acceptance data 218 may be generated after initiation of the transaction 110.N+1.

Operation 704 generates a verified acceptance of the new transfer transaction from the user 100A who received possession of the electronic token 200 following the current transfer transaction 110.N and the user 110B to receive possession of the electronic token 200 following the new transfer transaction 110.N+1. The verified acceptance may come before the electronic token 200 leaves the electronic vault 200A, when it is held and/or as it is cleared by the treasury server 400, or at another time. The verified acceptance may be required from the user 110A and/or from the user 110B. The verified acceptance may require an additional authentication means, for example a biometric, password, or other form of authentication. The biometric may be delivered in the form of a biometric data that includes information confirming and/or verifying the biometric reading. Operation 706 reads the electronic token 200 from the computer memory (e.g., the memory 503) and transmits the electronic token 200 to a computing device 502 of the user 100B to receive possession of the electronic token 200 following the new transfer transaction 110.N+1.

Operation 708 determines transaction completion when receiving a transaction completion data communicating the electronic token 200 has undergone a state evolution associated with the new transfer transaction 110.N+1. The transaction completion data may be generated by the electronic vault 500B of the user 100B receiving the electronic token 200, the treasury server 400, and/or the validation system 600. The transaction completion data in one or more embodiments may be a state hash 201.N+1 publishing to the validation system 600. Where the transaction 110.N+1 fails or does not complete within a set time, operation 710 may return the electronic token 200 to the electronic vault 500A of the user 100A and again for security evolve the state (e.g., generate a new instance of the state hash 201). Otherwise, if the transaction completion data is received, operation 712 may optionally delete the set of bits that was formerly the electronic token 200, now outdated by the state evolution, from the computer memory 503. It should be emphasized that deletion is optional and may not have any impact the security of the electronic token 200, which continues to evolve with each instance of the transaction 110.

FIG. 8 illustrates a token evolution process flow in which an evolved state of the electronic token 200 of FIG. 2 is calculated and published, according to one or more embodiments. Operation 800 receives an electronic token 200 in a current transfer transaction 110.N+1 and stores the electronic token 110.N+1 in a computer memory (e.g., the memory 503). For example, the electronic token 200 may include a data block 204 of a previous transfer transaction 110.N and a block hash 206.N of the data block 110.N of the previous transfer transaction 110.N representing a state of the electronic token 200 following the previous transfer transaction 110.N and generated as the output of a cryptographic hash function (e.g., the cryptographic hash function 530) with inputs comprising the transaction data 202.N of the previous transfer transaction 110.N. In one or more other embodiments, the electronic token 200 received in operation 800 may be the electronic token 200 of FIG. 2 or the electronic token 200 of FIG. 3. Operation 802 receives and/or generates a transaction data 202.N+1 of the current transfer transaction 110.N+1. Operation 802 may receive some of the partial data of the transaction data 202.N+1 that may be assembled in operation 702 of FIG. 7. Operation 804 generates a data block 204.N+1 for the transfer transaction 110.N+1 which may be set aside as a set of memory addresses in the memory 503 storing the electronic token 200. Operation 806 stores the transaction data 202.N+1 of the current transfer transaction 110.N+1 in a data block 204 of the current transfer transaction 110.N+1.

A series of operations may then be utilized to evolve the electronic token 200. Operation 808 gathers an entropic input from an entropy source (e.g., the entropy source 559). The entropy source 559, for example, may be inputs such as random motion of a smartphone measured by an accelerometer, a background noise picked up by a microphone, background interactions of the user 100 with a mouse and a keyboard, an entropy based on a quantum phenomenon of a manufacturing variation in a computer processor, and other methods as may be known in the art. In one or more alternate embodiments, a pseudorandom number generator may be used. Operation 810 generates and stores in the memory 503 a secret value 205 (e.g., the secret value 205.N+1) based on the entropic input. The secret value 205 may itself be the output of a cryptographic hash function wherein the input is the entropic input, and/or other methods that may be known in the art for generating a random number or string. In one or more alternative embodiments, the user 100 may be able to define the random value (e.g., a complicated pass phrase). Operation 812 inputs the secret value 205.N+1 and additional data into the cryptographic hash function 530 to calculate the block hash 205.N+1. For example, operation 812 may feed into a cryptographic hash function 530 inputs comprising the transaction data 202.N+1 of the current transfer transaction 110.N+1, the block hash 206.N of the data block 204.N of the previous transfer transaction 110.N, and the secret value 205.N+1. Operation 812 then generates the block hash 206.N+1 of the data block 204 of the current transfer transaction 110.N as the output of the cryptographic hash function 530.

Operation 814 generates a state hash 201.N+1. In one or more embodiments, the state hash 201.N+1 may be the block hash 206.N+1. In one or more other embodiments, a hash tree 300 may be utilized in which case the state hash 201.N+1 may be a level zero leaf node 302 of the hash tree 300 or a root node 301 of the hash tree 300. Operation 816 then communicates and/or publishes the state hash 201.N+1 as an evolved state of the electronic token 200. For example, operation 816 may transmit the state hash 201.N+1 to a state datastore 602, the state hash 201.N+1 representing the evolved state of the electronic token 200. The state hash 201.N+1 may be any of (i) the block hash 206.N+1 of the data block 204.N+1 of the current transfer transaction 110.N+1, (ii) an output of a cryptographic hash function 530 with inputs comprising the block hash 206.N+1 of the data block 204.N+1 of the current transfer transaction 110.N+1, and (iii) dependent on the block hash 204.N+1 of the data block 204.N+1 of the current transfer transaction 110N+1 (e.g., as is the root node 301 of the hash tree 300 through a hash chain).

Where the electronic token 200 is implemented as the hash tree 300, including the exclusion of one or more interstitial data blocks 204 from the electronic token 200, one or more additional processes may be used to advance the hash tree 300. First, the block hash 206.N of the data block 204.N of the previous transfer transaction 110.N as a level zero leaf node 302(0,N) of a hash tree 300 may be received and/or read. Second, a set of leaf nodes 302 of the hash tree 300 sufficient to re-calculate a root node 301 of the hash tree 300 following addition of a new level zero leaf node 302(0,N+1) of the hash tree 300 may be read and/or received. Third, a new set of leaf nodes 302 of the hash tree 300 and a new root node 301 of the hash tree 300 based on addition of the block hash 206.N+1 of the data block 204.N+1 of the current transfer transaction 110.N+1 as the new level zero leaf node 302(0,N+1) of the hash tree 300 may be re-calculated. Fourth, and optionally, the block hash 206.N of the data block 204.N of the previous transfer transaction 110.N and the set of leaf nodes 302 of the hash tree 300 sufficient to re-calculate the root node 301 of the hash tree 300 may be deleted from the hash tree 300 (By way of example in the embodiments of FIG. 3, the addition of the data block 204.7 would delete leaf node 302(0,6), 302(1,2), 302(2,1), and 302(3,0); the addition of the data block 204.8 would delete leaf node 302(0,7), and replace leaf nodes 302(1,3). 302(2,2), 302(3,1), and the root node 201.

FIG. 9 illustrates a first instance of a token validation process flow in which an ownership of the electronic token 200, the evolved state of the electronic token 200, and/or the transfer history of the electronic token 200 may be validated, according to one or more embodiments. Operation 900 receives a transfer instruction to initiate a current transfer transaction 110.N+1 of an electronic token 200. The transfer instruction may for example include a token ID 203 of the electronic token 200, a user ID 111A of a user 110A possessing the electronic token 200 before the current transfer transaction 110.N+1, and a user ID 111B of a user 100B to receive possession the electronic token 200. Operation 902 authenticates the user 110A possessing the electronic token 200 before the current transfer transaction 110.N+1 and a computing device of the user 110A possessing the electronic token 200 before the current transfer transaction 110.N+1 (e.g., the computing device 502 and/or a different computing device). Operation 904 determines that the user ID 111A of the user 100A possessing the electronic token 200 before the current transfer transaction 110.N+1 is associated with the token ID 201 in an acceptance record 402. The acceptance record 402 associating the user ID 111A with the token ID 203 may provide some evidence of a last known possessor of the electronic token 200, and a first check as to an authenticity or the electronic token 200 now being requested to transfer possession. However, in one or more embodiments, the acceptance record 402 is not necessary, as actual possession of the electronic token 200 determines ownership. Where no token ID 203 is found, or the user ID 111A is not associated with the electronic token 200 in the acceptance data 402, operation 904 may proceed to operation 906 which may generate an error message, for example to be communicated to the user 100A, the treasury server 400, stored in an error log, or sent to another location. Operation 908 optionally flags the token ID 203 of the electronic token 200 and/or places a freeze on the token ID 203 of the electronic token 200. If a match in the acceptance record 402 is determined, operation 904 proceeds to operation 910.

Operation 910 receives the electronic token 200, and optionally an acceptance data 218 and/or an acceptance seal 216 provided by one or more of the users 111 before or contemporaneously with the current transfer transaction 110.N+1. The electronic token 200 includes the secret value 205.N utilized in generating the block hash 206.N of the data block 204.N of the previous transfer transaction 110.N. The acceptance data 218 may comprise a biometric, such as a fingerprint reading or a facial recognition scan (e.g., as may be read by a thumb print reader and/or a camera on a smartphone). Operation 912 receives and/or reads an instance of the state hash 201.N of the electronic token 200 from a state datastore 602, the state datastore 602 independent of the user 111A possessing the electronic token 200 before the current transfer transaction 110.N+1. For example, the treasury server 400 may query the validation system 600 for the state hash 201.N. Operation 912 may have to extract one or more level zero leaf nodes 302 of the hash tree 300 from the state datastore 602 for re-calculation of the state hash 201.N+1.

Operation 914 inputs the data block 204.N of the previous transfer transaction 110.N and the secret value 203.N into one or more hash functions (e.g., the hash function 530 and any hash function required by any applicable hash tree 300). Operation 916 outputs a recalculated instance of the state hash 203.N of the electronic token 200 after the previous transfer transaction 110.N. Operation 916 may additionally re-calculate a root node 301 of the hash tree 300 with the level zero leaf nodes 302 of the hash tree 300. Operation 916 compares the first instance of the state hash 203.N and the re-calculated instance of the state hash 203.N, and determines whether there is a match between the recalculated instance of the state hash 203.N and the instance of the state hash 203.N of the electronic token 200 read from the state datastore 602 to validate the previous transfer transaction 110.N. Where no match is determined, operation 918 proceeds to operation 906. Where a match is determined, operation 918 proceeds to operation 920.

Operation 920 transmits the electronic token 200 to the electronic vault 500B of the user 100B, where the electronic token 200 may undergo a state evolution. Operation 922 may receive an evolved state hash 201.N+1 from a computing device 502B of the user 100B possessing the electronic token 200 after the current transfer transaction 110.N+1. Alternatively, the evolved state hash 201.N+1 may be published directly to the validation system 600. Operation 924 updates the user ID 111 of the acceptance record 402 to the a user ID 111B of the user 100B possessing the electronic token 200 after the current transfer transaction 110.N+1. A transaction completion data may be issued (e.g., by the treasury server 400 at one or more times following operation 918.

Additional validation of the electronic token 200 may also be conducted by the electronic vault 500, the treasury server 400, and/or the origin server 150. For example, where each data block 204 (e.g., each data block 204.1 through 204.N) is stored in the electronic token 200, as shown and described in conjunction with FIG. 2, and the secret value 205 for each data block 204 once disclosed is included with the electronic token (except a current data block 204.N), a validation of all data leading to a most recent state hash 201 may be conducted. For example, each block hash 206.1 through 206.N of each of the one or more interstitial data blocks 204.2 through 204.(N−1) may be re-calculated to validate a transaction history of the electronic token 200.

FIG. 10 illustrates a second instance of a token validation process flow in which an issuance and/or an authorization of the electronic token 200 may be validated, according to one or more embodiments. Operation 1000 extracts from at least one of the electronic token 200 and the state datastore 602 an instance of the block hash 206.1 of the data block 204.1 of the issue transaction 110.1. Operation 1002 reads and/or extracts an origin value 207 that may be withheld from the electronic token 200 before the issue transaction 110.1, wherein the input to the cryptographic hash function (e.g., the cryptographic hash function 430, the cryptographic hash function 530) outputting the state hash 201.1 of the data block 204.1 of the issue transaction 110.1 further comprising the origin value 207. The origin value 207 may be read from the authorized record 152. Operation 1004 inputs into the cryptographic hash function (e.g., the cryptographic hash function 430) the transaction data 202.1 of the issue transaction 110.1 and the origin value 207 (which may also be an instance of the origin hash 208). Operation 1006 generates a recalculated instance of the block hash 206.1 of the data block 204.1 of the issue transaction 110.1. Operation 1008 first compares the recalculated instance of the block hash 206.1 of data block 204.1 of the issue transaction 110.1 to the instance of the block hash 206.1 of the data block 204.1 of the issue transaction 110.1 read from the electronic token 200 and/or read from the state datastore 602. Operation 1008 then may determine a match between the recalculated instance the block hash 206.1 of data block 204.1 of the issue transaction 110.1 to the instance of the block hash 206.1 of the data block 204.1 of the issue transaction 110.1 read from at least one of the electronic token 200 and the state datastore 602 to validate issuance of the electronic token 200. If a match is not determined, operation 1008 may proceed to operation 906, and then to operation 908, described in conjunction with FIG. 9.

Where a match is determined, operation 1008 may proceed to operation 1020 which may generate a validation notice and/or permit a transaction 110 to proceed. However, where the origin value 207 is an origin hash 208, additional validation of the origin hash 208 may occur in which case operation 1008 may proceed to operation 1010. The origin value 207 may be an origin hash 208 generated as the output of a cryptographic hash function (e.g., a cryptographic hash function 130) with inputs comprising the cryptographic seed (e.g., the cryptographic seed 251).

Operation 1010 reads an instance of the origin hash 208 from an authorized record 152. Operation 1012 reads the cryptographic seed 251, which may also be stored in the authorized record 152, and/or may be stored as data on a physical medium, which may be referred to as a proof. Operation 1016 inputs into a cryptographic hash function (e.g., the cryptographic hash function 130) a set of inputs comprising the cryptographic seed 251. Operation 1016 generates a recalculated instance of the origin hash 208. Operation 1018 then compares the recalculated instance of the origin hash 208 with the instance of the origin hash 208 read from the authorized record 152 and determines a match between the recalculated instance of the origin hash 208 and the instance of the origin hash 208 read from the authorized record 152 to determine a valid authorization of the electronic token 200. If a match is not determined, operation 1018 can proceed to operation 916. Where a match is determined, operation 1018 proceeds to operation 1020.

FIG. 11 illustrates an issue transaction 110.1 of the electronic token 200, including a cryptographic tie between the electronic token 200 and an asset (e.g., specified by the asset ID 214), according to one or more embodiments. In the embodiment of FIG. 11, an instance of the electronic token 200 is initiated using an origin hash 208. However, as shown, the origin value 207 may also be utilized. The origin hash 208 is formed as the output of the cryptographic hash function 130 inputting a token ID 203 (that may be a GUID of 32 characters), a cryptographic seed 251, and a date 222 of authorization of the electronic token 200. The inputs may be stored in the authorization record 152, with the cryptographic seed 251 optionally withheld and/or stored as a proof.

In the embodiment of FIG. 11, an instance of the acceptance record is illustrated. The acceptance record may be stored in a standard database (e.g., as entries in a relational database), or itself be stored in a blockchain data structure and/or utilizing a hash tree data structure. The assurance seal 216 may be a hash of (e.g., a cryptographic hash function output) data specifying the asset that the electronic token 200 represents, for example the asset ID 214 and/or the settlement data 212. The asset ID 203, for example, may specify a gold bar or a storage container in a repository storing a quantity of gold. The user 111 may be the recipient of possession of the electronic token 200 at the issue transaction 110.1. An acceptance seal 220 can be generated which can be included in the transaction data 204.1 of the electronic token 200 for auditing purposes so that data block 206.1 can be tied to data in the acceptance record 402. In the embodiment of FIG. 11, the token Id 203, the settlement data 212 and/or the asset ID 214, the acceptance seal 220, and the date 222 of the issue transaction 110.1 is included in the transaction data 204. Along with the origin value 207 or the origin hash 208 and the secret value 205.1, the transaction data is input into the cryptographic hash function 530 to output the block hash 206.1 representing an evolved state of the electronic token 200 following the issue transaction 110.1. The block hash 206.1 is published as the state hash 201.1 to the state datastore 602 where it may be stored in association with the token Id 203 of the electronic token 200.

FIG. 12 illustrates the electronic token of FIG. 11 after 'N' transactions, according to one or more embodiments. The acceptance record 402 may include both a user ID 111 of a user 100 sending the electronic token 200, and a user ID 111 of a user 100 receiving possession of the electronic token 200. The block hash 206.N is the output of a cryptographic hash function 530 with inputs comprising the block hash 206.N−1, forming a dependency 210 as shown and described in FIG. 2. The disclosure record 404 may include each secret value 205.1 through 205.N−1 turned to verify and complete transactions 110.1 though 110.N, and the state datastore 602 may now store a set of state hashes 201.1 through 201.N.

Although the present embodiments have been described with reference to specific example embodiments, it will be evident that various modifications and changes may be made to these embodiments without departing from the broader spirit and scope of the various embodiments. For example, the various devices, servers and engines described herein may be enabled and operated using hardware circuitry (e.g., CMOS based logic circuitry), firmware, software or any combination of hardware, firmware, and software (e.g., embodied in a non-transitory machine-readable medium). For example, the various electrical structure and methods may be embodied using transistors, logic gates, and electrical circuits (e.g., application specific integrated (ASIC) circuitry and/or Digital Signal Processor (DSP) circuitry). One skilled in the art will recognize that unless notes each of the components of the data processing systems are connected to each other component, e.g., through a memory bus.

In addition, it will be appreciated that the various operations, processes and methods disclosed herein may be embodied in a non-transitory machine-readable medium and/or a machine-accessible medium compatible with a data processing system (e.g., the origin server 150, the exchange server 160, the treasury server 400, a computing device 502, the electronic vault 500, the validation system 600 and/or each computing node 605 of the validation system 600). Accordingly, the specification and drawings are to be regarded in an illustrative rather than a restrictive sense.

The structures and engines in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the preceding disclosure.

We claim:

1. A method for cryptographically securing an electronic token in a computer memory to enable actual possession of the electronic token, the method comprising:

receiving the electronic token for a current transfer transaction and storing the electronic token in the computer memory, the electronic token comprising a data block of a previous transfer transaction and a block hash of the data block of the previous transfer transaction representing a state of the electronic token following the previous transfer transaction and generated as an output of a cryptographic hash function with inputs comprising a transaction data of the previous transfer transaction;

generating a transaction data of the current transfer transaction comprising data at least one of received at the computer memory and generated on the computer memory;

storing the transaction data of the current transfer transaction in a data block of the current transfer transaction;

gathering an entropic input from an entropy source;

generating a secret value based on the entropic input;

adding the data block of the current transfer transaction to the electronic token;

feeding inputs into a first cryptographic hash function, wherein the inputs comprise the transaction data of the current transfer transaction, the block hash of the data block of the previous transfer transaction, and the secret value;

generating a block hash of the data block of the current transfer transaction as an output of the first cryptographic hash function;

storing the secret value in the computer memory; and publishing a state hash representing an evolved state of the electronic token that is at least one of the block hash of the data block of the current transfer transaction, an output of a cryptographic hash function with inputs comprising the block hash of the data block of the current transfer transaction, and a value that is dependent on the block hash of the data block of the current transfer transaction, to establish an independent evidence of evolution of the electronic token.

2. The method of claim 1, further comprising:
at least one of reading and receiving a set of block hashes for each data block previously generated in a set of transfer transactions of the electronic token,
wherein the set of block hashes are level zero leaf nodes of a hash tree; and
re-calculating a root node of the hash tree with the level zero leaf nodes of the hash tree,
wherein the state hash representing the evolved state of the electronic token following the current transfer transaction is the root node of the hash tree.

3. The method of claim 2, further comprising:
at least one of reading and receiving the block hash of the data block of the previous transfer transaction as a level zero leaf node of a hash tree;
at least one of reading and receiving a set of leaf nodes of the hash tree sufficient to re-calculate a root node of the hash tree following addition of a new level zero leaf node of the hash tree;
calculating a new set of leaf nodes of the hash tree and a new root node of the hash tree based on addition of the block hash of the data block of the current transfer transaction as the new level zero leaf node of the hash tree; and
deleting from the hash tree the block hash of the data block of the previous transfer transaction and the set of leaf nodes of the hash tree sufficient to re-calculate the root node of the hash tree.

4. The method of claim 3, wherein a distributed database stores a state datastore on two or more computing nodes communicatively coupled through a network.

5. The method of claim 4, wherein the distributed database is rendered eventually consistent through a raft algorithm.

6. The method of claim 4, wherein the distributed database stores a copy of the state datastore on each of the two or more computing nodes and reconciled through a consensus mechanism executed through a consensus algorithm of each of the two or more computing nodes.

7. The method of claim 6, wherein the consensus mechanism is a byzantine fault tolerance.

8. The method of claim 7, further comprising:
generating a transfer instruction initiating a new transfer transaction in which possession of the electronic token to transfer to a user to receive possession of the electronic token following the new transfer transaction;
generating a transaction data of the new transfer transaction;
generating a verified acceptance of the new transfer transaction from at least one of a user who received possession of the electronic token following the current transfer transaction and the user to receive possession of the electronic token following the new transfer transaction;
reading the electronic token from the computer memory and transmitting the electronic token to a computing device of the user to receive possession of the electronic token following the new transfer transaction;
receiving a transaction completion data communicating that the electronic token has undergone a state evolution associated with the new transfer transaction; and
optionally deleting the electronic token, now outdated by the state evolution, from the computer memory.

9. A device for processing an electronic token that can be actually possessed and comprises a state of the electronic token within a sequence of one or more transactions of the electronic token, the device comprising:
a processor; and
a computer readable memory that is non-transitory comprising computer readable instructions that, when executed on the processor, cause the processor to:
receive the electronic token for a current transfer transaction and storing the electronic token in the computer readable memory, the electronic token comprising a data block of a previous transfer transaction and a block hash of the data block of the previous transfer transaction representing a state of the electronic token following the previous transfer transaction and generated as an output of a cryptographic hash function with inputs comprising a transaction data of the previous transfer transaction;
generate a transaction data of the current transfer transaction comprising data at least one of received by the device and generated by the device;
store the transaction data of the current transfer transaction in a data block of the current transfer transaction;
gather an entropic input from an entropy source;
generate a secret value based on the entropic input;
add the data block of the current transfer transaction to the electronic token;
feed inputs into a first cryptographic hash function, wherein the inputs comprise the transaction data of the current transfer transaction, the block hash of the data block of the previous transfer transaction, and the secret value;
generate a block hash of the data block of the current transfer transaction as an output of the first cryptographic hash function;
store the secret value in the computer readable memory; and
transmit to a server for subsequent validation a state hash representing an evolved state of the electronic token that is at least one of the block hash of the data block of the current transfer transaction, an output of a cryptographic hash function with inputs comprising the block hash of the data block of the current transfer transaction, and a value that is dependent on the block hash of the data block of the current transfer transaction, to establish an independent evidence of evolution of the electronic token.

10. The device of claim 9, wherein the computer readable memory comprising the computer readable instructions that, when executed on the processor, further cause the processor to:
at least one of reading and receiving a set of block hashes for each data block previously generated in a set of transfer transactions of the electronic token,
wherein the set of block hashes are level zero leaf nodes of a hash tree; and
re-calculating a root node of the hash tree with the level zero leaf nodes of the hash tree,
wherein the state hash representing the evolved state of the electronic token following the current transfer transaction is the root node of the hash tree.

11. The device of claim 10, wherein the computer readable memory comprising the computer readable instructions that, when executed on the processor, further cause the processor to:

at least one of read and receive the block hash of the data block of the previous transfer transaction as a level zero leaf node of a hash tree;

at least one of reading and receiving a set of leaf nodes of the hash tree sufficient to re-calculate a root node of the hash tree following addition of a new level zero leaf node of the hash tree;

calculate a new set of leaf nodes of the hash tree and a new root node of the hash tree based on addition of the block hash of the data block of the current transfer transaction as the new level zero leaf node of the hash tree; and delete from the hash tree the block hash of the data block of the previous transfer transaction and the set of leaf nodes of the hash tree sufficient to re-calculate he root node of the hash tree.

12. The device of claim 11, wherein a distributed database stores a state datastore on two or more computing nodes communicatively coupled through a network, and wherein the distributed database is rendered eventually consistent through at least one of: (i) a raft algorithm; (ii) the distributed database storing a copy of the state datastore on each of the two or more computing nodes and reconciled through a consensus mechanism executed through a consensus algorithm of each of the two or more computing nodes; and (iii) byzantine fault tolerance.

13. The device of claim 12, wherein the computer readable memory comprising the computer readable instructions that, when executed on the processor, further cause the processor to:

generate a transfer instruction initiating a new transfer transaction in which possession of the electronic token to transfer to a user to receive possession of the electronic token following the new transfer transaction;

generate a transaction data of the new transfer transaction;

generate a verified acceptance of the new transfer transaction from at least one of a user who received possession of the electronic token following the current transfer transaction and the user to receive possession of the electronic token following the new transfer transaction;

read the electronic token from the computer readable memory and transmitting the electronic token to a computing device of the user to receive possession of the electronic token following the new transfer transaction;

receive a transaction completion data communicating that the electronic token has undergone a state evolution associated with the new transfer transaction; and optionally delete the electronic token, now outdated by the state evolution, from the computer readable memory.

14. A non-transitory computer readable medium for processing an electronic token that can be actually possessed, the non-transitory computer readable medium comprising computer readable instructions that, when executed on a processor, cause the processor to:

receive the electronic token for a current transfer transaction and store the electronic token, wherein the electronic token comprising a data block of a previous transfer transaction and a block hash of the data block of the previous transfer transaction representing a state of the electronic token following the previous transfer transaction and generated as an output of a cryptographic hash function with inputs comprising a transaction data of the previous transfer transaction;

generate a transaction data of the current transfer transaction comprising data at least one of received by the processor and generated by the processor;

store the transaction data of the current transfer transaction in a data block of the current transfer transaction;

gather an entropic input from an entropy source;

generate a secret value based on the entropic input;

add the data block of the current transfer transaction to the electronic token;

feed inputs into a first cryptographic hash function, wherein the inputs compris e the transaction data of the current transfer transaction, the block hash of the data block of the previous transfer transaction, and the secret value;

generate a block hash of the data block of the current transfer transaction as an output of the first cryptographic hash function;

store the secret value; and transmit to a server for subsequent validation a state hash representing an evolved state of the electronic token that is at least one of the block hash of the data block of the current transfer transaction, an output of a cryptographic hash function with inputs comprising the block hash of the data block of the current transfer transaction, and a value that is dependent on the block hash of the data block of the current transfer transaction, to establish an independent evidence of evolution of the electronic.

15. The non-transitory computer readable medium of claim 14, wherein the computer readable instructions, when executed on the processor, further cause the processor to:

at least one of reading and receiving a set of block hashes for each data block previously generated in a set of transfer transactions of the electronic token, wherein the set of block hashes are level zero leaf nodes of a hash tree; and re-calculating a root node of the hash tree with the level zero leaf nodes of the hash tree, wherein the state hash representing the evolved state of the electronic token following the current transfer transaction is the root node of the hash tree.

16. The non-transitory computer readable medium of claim 15, wherein the computer readable instructions, when executed on the processor, further cause the processor to:

at least one of read and receive the block hash of the data block of the previous transfer transaction as a level zero leaf node of a hash tree;

at least one of reading and receiving a set of leaf nodes of the hash tree sufficient to re-calculate a root node of the hash tree following addition of a new level zero leaf node of the hash tree;

calculate a new set of leaf nodes of the hash tree and a new root node of the hash tree based on addition of the block hash of the data block of the current transfer transaction as the new level zero leaf node of the hash tree; and delete from the hash tree the block hash of the data block of the previous transfer transaction and the set of leaf nodes of the hash tree sufficient to re- calculate the root node of the hash tree.

17. The non-transitory computer readable medium of claim 16, wherein a distributed database stores a state datastore on two or more computing nodes communicatively coupled through a network, and wherein the distributed database is rendered eventually consistent through at least one of: (i) a raft algorithm; (ii) the distributed database storing a copy of the state datastore on each of the two or more computing nodes and reconciled through a consensus mechanism executed through a consensus algorithm of each of the two or more computing nodes; and (iii) byzantine fault tolerance.

18. The non-transitory computer readable medium of claim 17, wherein the computer readable instructions, when executed on the processor, further cause the processor to:
generate a transfer instruction initiating a new transfer transaction in which possession of the electronic token to transfer to a user to receive possession of the electronic token following the new transfer transaction;
generate a transaction data of the new transfer transaction;
generate a verified acceptance of the new transfer transaction from at least one of a user who received possession of the electronic token following the current transfer transaction and the user to receive possession of the electronic token following the new transfer transaction;
read the electronic token and transmit the electronic token to a computing device of the user to receive possession of the electronic token following the new transfer transaction;
receive a transaction completion data communicating that the electronic token has undergone a state evolution associated with the new transfer transaction; and
optionally delete the electronic token, now outdated by the state evolution.

\* \* \* \* \*